United States Patent
Heacox et al.

(10) Patent No.: US 10,773,754 B2
(45) Date of Patent: Sep. 15, 2020

(54) SYSTEMS AND METHODS FOR PROTECTION OF FLOORINGS IN SHIPPING CONTAINERS

(71) Applicant: Triton Container International Limited, Hamilton (BM)

(72) Inventors: Henry Eugene Heacox, Palmyra, VA (US); H. Keith Hunt, Scroggins, TX (US); Ricky Alleson Cribbs, Ovilla, TX (US)

(73) Assignee: Triton Container International Limited, Hamilton (BM)

( * ) Notice: Subject to any disclaimer, the term of this patent is extended or adjusted under 35 U.S.C. 154(b) by 0 days.

(21) Appl. No.: 15/659,540

(22) Filed: Jul. 25, 2017

(65) Prior Publication Data

US 2018/0178851 A1    Jun. 28, 2018

Related U.S. Application Data

(63) Continuation of application No. 14/334,548, filed on Jul. 17, 2014, now Pat. No. 9,714,054.

(51) Int. Cl.
| | |
|---|---|
| *B62D 25/20* | (2006.01) |
| *B65D 90/08* | (2006.01) |
| *B65D 88/12* | (2006.01) |
| *B65D 90/02* | (2019.01) |

(Continued)

(52) U.S. Cl.
CPC ............. *B62D 25/20* (2013.01); *B23P 19/04* (2013.01); *B62D 25/2009* (2013.01); *B62D 25/2054* (2013.01); *B62D 25/2072* (2013.01); *B65D 88/121* (2013.01); *B65D 90/02* (2013.01); *B65D 90/028* (2013.01); *B65D 90/08* (2013.01); *B62D 25/2063* (2013.01); *E04H 2001/1283* (2013.01)

(58) Field of Classification Search
CPC .................................................. B62D 25/20; B62D 25/2054; B62D 25/2072; B62D 25/2063; B62D 25/2009; B65D 90/08; B65D 90/02; B65D 90/028; B65D 88/121; B65D 88/12; E04H 2001/1283
USPC ........................................................ 220/1.5
See application file for complete search history.

(56) References Cited

U.S. PATENT DOCUMENTS

| | | |
|---|---|---|
| 2,120,802 A | 6/1938 | Focht |
| 3,080,021 A | 3/1963 | Muir |
| 3,910,446 A | 10/1975 | Dougherty |

(Continued)

*Primary Examiner* — Fenn C Mathew
*Assistant Examiner* — Jennifer Castriotta
(74) *Attorney, Agent, or Firm* — Sheppard, Mullin, Richter & Hampton LLP

(57) ABSTRACT

An exemplary approach for protecting floorings in containers may utilize a first ledger attached to an upper portion of a first support beam associated with a foundational base assembly. A portion of the first ledger may protrude outward in a first horizontal direction from the upper portion of the first support beam. A second ledger may be attached to an upper portion of a second support beam next to the first support beam. A portion of the second ledger may protrude outward in a second horizontal direction from the upper portion of the second support beam. The second horizontal direction may face the first horizontal direction. A support panel may be placed on top of the portion of the first ledger and the portion of the second ledger. The support panel may have a length proximate to a distance between the first support beam and the second support beam.

24 Claims, 17 Drawing Sheets

(51) Int. Cl.
*B23P 19/04* (2006.01)
*E04H 1/12* (2006.01)

(56) References Cited

U.S. PATENT DOCUMENTS

| | | |
|---|---|---|
| 4,249,684 A | 2/1981 | Miller |
| 4,357,047 A | 11/1982 | Katz |
| 4,526,418 A | 7/1985 | Martin |
| 4,761,031 A | 8/1988 | Rowe |
| 4,906,021 A | 3/1990 | Rowe |
| 4,951,992 A | 8/1990 | Hockney |
| 4,966,082 A | 10/1990 | Takeichi |
| 5,145,309 A | 9/1992 | Foster |
| 5,248,051 A | 9/1993 | Yurgevich |
| 5,655,792 A | 8/1997 | Booher |
| 5,741,042 A | 4/1998 | Livingston |
| 6,382,457 B1 | 5/2002 | Bernard |
| 6,497,937 B1 * | 12/2002 | Lam ................... B32B 21/14 428/106 |
| 2008/0087666 A1 | 4/2008 | Chen |
| 2011/0298245 A1 | 12/2011 | Jarocki |
| 2012/0011785 A1 | 1/2012 | Kulas |
| 2012/0104796 A1 | 5/2012 | Balaz |

* cited by examiner

```
┌─────────────────────────────────────────────────────────────────────┐
│ Attach a first ledger to an upper portion of a first support beam   │
│ associated with a foundational base assembly                        │
│                            1202                                      │
└─────────────────────────────────────────────────────────────────────┘
                                 │
                                 ▼
┌─────────────────────────────────────────────────────────────────────┐
│ Attach a second ledger to an upper portion of a second support beam │
│ next to the first support beam                                       │
│                            1204                                      │
└─────────────────────────────────────────────────────────────────────┘
                                 │
                                 ▼
┌─────────────────────────────────────────────────────────────────────┐
│ Place a support panel on top of the first ledger and the second ledger │
│                            1206                                      │
└─────────────────────────────────────────────────────────────────────┘
```

FIG. 12A

Absorb, by a support panel, an amount of force
1252

Distribute, by the support panel, the amount of force to a first support beam and to a second support beam
1254

Reduce an amount of stress incurred by wood flooring overlaying the support panel
1256

SYSTEMS AND METHODS FOR PROTECTION OF FLOORINGS IN SHIPPING CONTAINERS

CROSS-REFERENCE TO RELATED APPLICATIONS

The present application is a continuation of U.S. patent application Ser. No. 14/334,548, filed Jul. 17, 2014 and entitled "Systems and Methods for Protection of Floorings in Shipping Containers," now U.S. Pat. No. 9,714,054, which is hereby incorporated herein by reference.

BACKGROUND

1. Field of the Invention(s)

The present invention(s) generally relates to support structures. More particularly, the invention(s) relates to systems and methods for protection of floorings in shipping containers by utilizing support structures.

2. Introduction

Floors can be used in a wide variety of environments, such as in private homes, in public spaces, and in commercial properties. In particular, shipping containers have floors on which goods or other items are stored. In some cases, the floors of shipping containers can include an upper layer of wood flooring that overlays a plurality of support beams such as cross-members.

A floor provides a foundational base structure that can support weight. In order to protect the floor from damage and protect goods from being damaged by the floor (e.g., moving or storage), different, stronger flooring materials are generally utilized.

Quality, stronger woods, such as Asian hardwoods, are becoming more rare. The reduced availability of such wood has led to a reduction in the quality of the wood flooring supplied to container factories. As a result, container floorings are failing prematurely and flooring repair costs have increased significantly. In some cases, flooring repair costs have become approximately 20% of combined owner and user repair costs. Since the availability of suitable wood (e.g., Asian hardwood) will likely continue to decrease in the future, flooring repair costs will likely increase. In the shipping industry, the poor quality of wood flooring can create significant technical and economic challenges for shipping container owners and users.

FIG. 1 illustrates an example shipping container 100 of the prior art. The example shipping container 100 includes an entrance 102. The entrance 102 can be used, such as by forklift or truck vehicles, to deposit and retrieve goods or other items to be stored in the shipping container 100. As shown in FIG. 1, an X-ray view 104 into the shipping container 100 depicts that the shipping container 100 has a foundational base assembly, such as a floor 106. The floor 106 can be formed by a plurality of support beams, such as cross-members 108, spanning transversally across the width of the shipping container 100. Moreover, as shown in FIG. 1, the floor 106 of the shipping container 100 includes an upper layer of wood flooring 110, such as Asian hardwood flooring.

One solution that has been proposed is to replace all of the flooring of a shipping container with steel. The process, however, is expensive, increases the weight of the shipping container to the point where shipping is prohibitive, and the steel flooring may damage cargo during storage or transit.

Another solution is to move the cross-members 108 closer together. FIG. 2 illustrates an example individual forklift wheel 202 on top of a shipping container floor 204 of the prior art. FIG. 2 can illustrate a wheel contact position in rolling shear. Finite Element Analysis (FEA) modeling can be used to identify a critical load condition that is most likely to result in floor failure. In FIG. 2, the container cross-members 206 and 208 are spaced approximately 11.81 inches or 300 millimeters (mm) apart. The position of the forklift wheel 202 as shown in the example of FIG. 2, applies approximately 83% of the shear load through the local plywood 210 thickness and adjacent to the cross-member 206 (the shear load being applied along plane 212). In this example, the calculated shear stress corresponds to the wheel load×83% divided by the area in shear: Shear Stress=(12,000 lbs.×83%)/(7.48 inches×1.125 inches) =1183.6 pound-force per square inch (psi) average, which compares well to the FEA peak shear value of 1212.83 psi.

Those skilled in the art will appreciate that, when viewing rolling shear, moving the cross-members 108 is not only expensive (requiring adjustments to manufacturing new shipping containers and additional materials), but also is likely to lead to more, not less, damage.

It follows that excessive load or force due to forklift wheels can decrease or shorten the life span of the container wood flooring. The wood flooring may not be practically effective at, or sufficiently capable of, withstanding the load or force.

As discussed above, the poor quality of wood flooring and/or the force from forklift wheels can create significant technical and economic challenges for shipping container owners and users. Conventional approaches taken by container industry suppliers or owners in attempt to address these challenges are discussed below.

One conventional approach involves attempting to replace Asian hardwood with an alternative wood or non-wood product. Various alternatives to Asian hardwood have been suggested, but none have been able to meet the combined strength, production capacity, compatibility with container base structure designs, and/or cost constraints that would make them viable alternatives. There is a lack of promising alternatives under development at this time.

Another conventional approach involves minimizing the use of wood by using steel or mixtures of steel and wood instead. Many designs have been proposed and prototypes have been built using all steel floors or various combinations of steel and wood. Most of them have met functional requirements, but added an unacceptable amount of weight to the container, were incompatible with container assembly line processes, and as a result, were too heavy and/or costly to be used.

A further conventional approach involves reducing the unsupported floor span by adding cross-members. This approach is based on a lack of understanding of the critical failure mode of container flooring, and although intuitively attractive, does not reduce the shear stress levels that cause floor failure. Spans are already short enough that the floor is shear critical (and not bending critical) and further reducing spans does not change this.

Accordingly, there is a need for an improved approach for protecting floorings in containers.

SUMMARY OF THE INVENTION

Systems and methods for providing protection of floorings in containers are discussed herein. An exemplary system comprises a first ledger, a second ledger, and a support panel. The first ledger may be attached to an upper portion of a first support beam associated with a foundational base assembly. A portion of the first ledger may protrude outward in a first horizontal direction from the upper portion of the first support beam. The second ledger may be attached to an upper portion of a second support beam next to the first support beam. A portion of the second ledger may protrude outward in a second horizontal direction from the upper portion of the second support beam. The second horizontal direction may be facing the first horizontal direction. The support panel may be placed on top of the portion of the first ledger and the portion of the second ledger. The support panel may have a length proximate to a distance between the first support beam and the second support beam.

In some embodiments, the foundational base assembly may be a floor. The floor may be part of a shipping container. The support panel may be placed proximate to an entrance of the shipping container. For example, if the shipping container is 40 feet in longitudinal length, then support panels may be placed in an area between 0 and 8 feet in longitudinal length from the entrance of the shipping container. In another example, if the shipping container is 20 feet in longitudinal length, then support panels may be placed in an area between 0 and 4 feet in longitudinal length from the entrance of the shipping container. In some embodiments, the shipping container may be at least one of a 20 feet long shipping container or a 40 feet long shipping container. The foundational base assembly may be overlaid with a layer of wood flooring. For example, a shipping container foundational base assembly may be overlaid with a layer of Asian hardwood flooring. The layer of wood flooring may be fastened onto the support panel.

In some embodiments, the support panel may be: 1) detachably placed or 2) secured, onto the portion of the first ledger and the portion of the second ledger. Detachably placing the support panel may refer to dropping-in or placing the support panel onto the ledgers without attaching or securing the support panel to the ledgers. However, in some cases, the support panel may be attached or secured to the ledgers as needed. In various embodiments, attaching the first ledger attached to the upper portion of the first support beam comprises forming the first support beam with the first ledger. Similarly, attaching the second ledger to the upper portion of the second support beam may comprise forming the second support beam with the second ledger.

In some embodiments, the first ledger and the second ledger may each include at least one of an angle ledger, a flat ledger, a ledger having a rectangular cross section, a ledger having a triangular cross section, a ledger having a round cross section, or a ledger having a solid cross section. The first ledger may include the angle ledger and the second ledger may include the flat ledger. The angle ledger may have a first plane and a second plane connected perpendicularly along edges of the first and second planes. The first plane may be attached to the upper portion of the first support beam and the second plane may protrude in the first horizontal direction from the upper portion of the first support beam. The flat ledger may have a third plane. A first portion of the third plane may be attached to the upper portion of the second support beam and a second portion of the third plane may protrude in the second horizontal direction from the upper portion of the second support beam.

In various embodiments, each of the first support beam and the second support beam may include at least one of a C-beam cross-member, an I-beam cross-member, a cross-member having a rectangular cross section, or a cross-member having a solid cross section. For example, in a scenario where two I-beam cross-members are placed next to each other, two flat ledgers may be used. One flat ledger may be attached underneath an upper flange portion of one I-beam cross-member and another flat ledger may be attached underneath an upper flange portion of the other I-beam cross-member. A support panel may thus be placed on the two flat ledgers in between the two I-beam cross-members.

In some embodiments, at least a portion of material used to construct the support panel may be removed, thereby reducing a weight of the support panel.

In various embodiments, a second support panel may be placed proximate to 38.5980 inches in transversal distance away from the support panel. The second support panel may be placed on top of a portion of a third ledger attached to the first support beam and on top of a portion of a fourth ledger attached to the second support beam. In some embodiments, each of the support panel and the second support panel may have a transversal width proximate to 15.0000 inches.

Another exemplary system comprises a first ledger means, a second ledger means, and a support panel. The first ledger means may be attached to an upper portion of a first support beam associated with a foundational base assembly. A portion of the first ledger means may protrude outward in a first horizontal direction from the upper portion of the first support beam. The second ledger means may be attached to an upper portion of a second support beam next to the first support beam. A portion of the second ledger means may protrude outward in a second horizontal direction from the upper portion of the second support beam. The second horizontal direction may be facing the first horizontal direction. The support panel may be placed on top of the portion of the first ledger means and the portion of the second ledger means. The support panel may have a length proximate to a distance between the first support beam and the second support beam.

Another exemplary method comprises forming a foundational base assembly of a shipping container, the foundational base assembly comprising a first support beam and a second support beam, the first support beam being proximate to the second support beam, each support beam further including an upper portion, coupling a support panel at the upper portion of the first support beam associated with the foundational base assembly, and coupling the support panel at the upper portion of the second support beam, the support panel having a length proximate to a distance between the first support beam and the second support beam.

An exemplary method comprises attaching a first ledger to an upper portion of a first support beam associated with a foundational base assembly. A portion of the first ledger may protrude outward in a first horizontal direction from the upper portion of the first support beam. The exemplary method also comprises attaching a second ledger to an upper portion of a second support beam next to the first support beam. A portion of the second ledger may protrude outward in a second horizontal direction from the upper portion of the second support beam. The second horizontal direction may be facing the first horizontal direction. The exemplary method further comprises placing a support panel on top of the portion of the first ledger and the portion of the second ledger. The support panel may have a length proximate to a distance between the first support beam and the second support beam.

Another exemplary method comprises absorbing, by a support panel, an amount of force. The support panel may be placed on top of a portion of a first ledger and on top of a portion of a second ledger. The exemplary method also comprises distributing, by the support panel, the amount of force to a first support beam having an upper portion attached to the first ledger and to a second support beam having an upper portion attached to the second ledger. The exemplary method further comprises reducing an amount of stress incurred by at least a portion of a wood flooring overlaying the support panel. The amount of stress being reduced based on the distributing, by the support panel, of the amount of force to the first support beam and to the second support beam. In some embodiments, the support panel may distribute the amount of force to the first support beam via the first ledger and to the second support beam via the second ledger.

Many other features and embodiments of the present disclosure will be apparent from the accompanying drawings and from the following detailed description.

BRIEF DESCRIPTION OF THE DRAWINGS

FIG. 12A illustrates an example flow diagram for providing protection of floorings in some embodiments.

Figure 1:
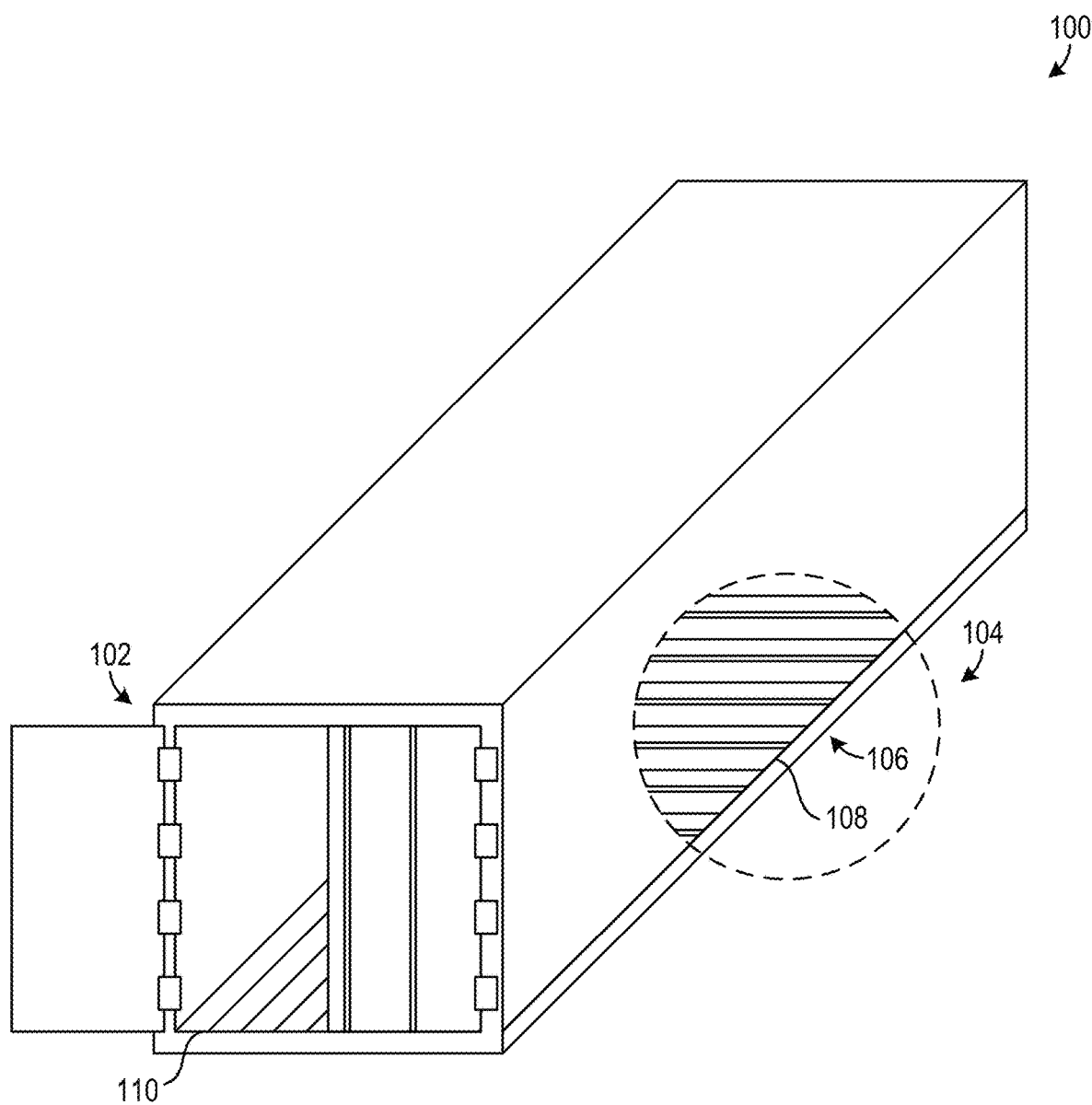
FIG. 1 illustrates an example shipping container of the prior art.
Figure 2:
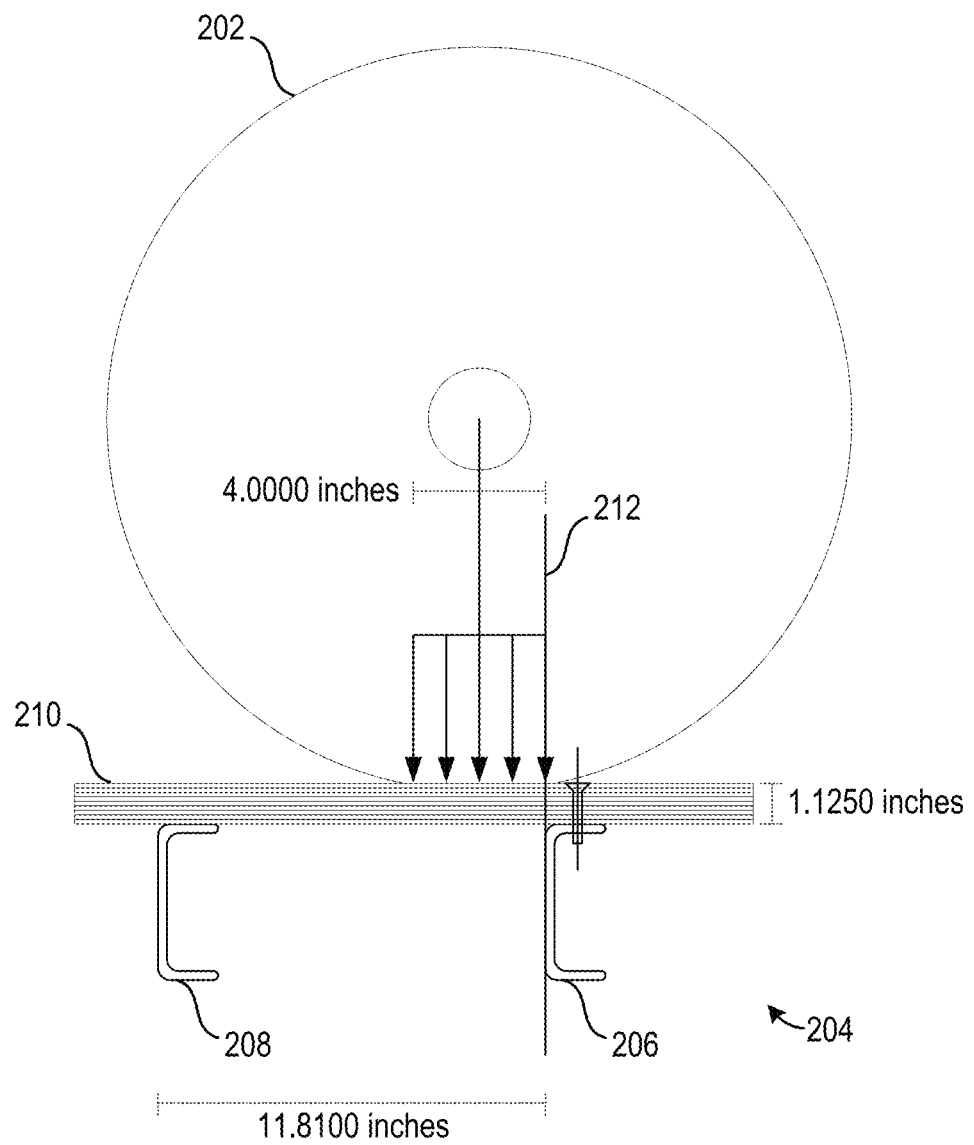
FIG. 2 illustrates an example individual forklift wheel on top of an example shipping container floor of the prior art.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures may be employed without departing from the principles of the disclosed technology described herein. Moreover, it should be noted that the figures are not necessarily drawn to scale and that dimensions illustrated in the figures are for purposes of illustration only and are not limiting in scope.

DETAILED DESCRIPTION OF THE INVENTION

Various embodiments described herein provide protection of floorings in containers such as shipping containers. For one example, some embodiments of systems and methods described herein may provide protection of wood flooring in a shipping container (e.g., cargo shipping container) by utilizing support panels. A shipping container may include a reusable steel container used for intermodal shipments (e.g., international shipping container) such as an intermodal freight container.

As discussed previously, the poor quality of wood flooring and/or the force from forklift wheels can create a significant technical and economic problem for shipping container owners and users. Applicants recast this problem by ignoring the convention that the container floor had to be of homogeneous construction from the entrance door (e.g., rear) to the opposite end (e.g., front) of the container. Instead, it was decided that the floor should be stronger only where it needed to be stronger, and reinforcements of the floor should be only strong enough to prevent failure.

Moreover, the definition of failure was expanded beyond the standard leasing industry definition—which suggests that "broken" means "failure and repair required"—to include a more pragmatic, operational definition. As such, the ability to support the floor so that the container can continue to operate even when the floor is technically broken was a design consideration. The objective became not only to reduce the likelihood of breakage, but also to increase the likelihood that the container can continue to operate with a broken floor. This can have significant economic value by reducing in-service repair costs and by allowing containers with broken floors to be retired and sold in the higher valued cargo-worthy condition. Some embodiments described herein may be utilized with a floor that is technically broken.

In addition, cost analysis was used to determine the longitudinal (e.g., lengthwise) location of floor damage, and forklift dimensions and operations were studied in order to determine the transverse location of damage. This led to the identification of the high payback areas of the floor. It was found that strengthening, supporting, or reinforcing 7% of the floor area could potentially reduce repair costs by 50%.

Furthermore, Finite Element Analysis (FEA) modeling was used to optimize the stiffness and minimize the weight of the reinforcing materials (e.g., support panels).

Manufacturability was also considered at all steps in the design of the reinforcements (e.g., support panels). Objectives that were considered included low or no modification of the standard container assembly line. For example, in some embodiments described herein, all additional welding is performed at the piece part stage and assembly only requires drop-in parts (i.e., no welding) just prior to upper flooring layer installation.

One fundamental difference between conventional approaches and some (but not necessarily all) embodiments described herein is that the conventional approaches addressed primarily technical requirements with little concern for economic factors, whereas at least some embodiments addresses optimization in both the cost/benefit sense but also in the structural sense via the minimum (or limited) use of material. Some embodiments require an application of a higher level of analysis and technology to reach a conclusion or solution.

At least some embodiments can be developed in accordance with the following sequence or process. First, floor damage costs are analyzed to identify the distribution of cost by longitudinal location in shipping containers. Second, forklift loading practices are studied to determine the most common travel paths, tracks, or traces at the door end of containers. Third, forklift track widths and tire widths are studied to identify the load corridor at the door end of the containers. Fourth, the combination of load corridor and cost distribution are used to identify the areas of the floor that presented the best opportunity for cost effective improvement (i.e., reinforcing 7% of the floor area to reduce 50% of repair costs). Fifth, FEA modeling are used to identify the critical load condition that was most likely to result in floor failure. Sixth, FEA modeling are used to optimize reinforcing plate (i.e., support panel) design weight and stiffness with maximum support in the load corridor areas only. Seventh, container manufacturing methods are studied and the plates can be designed to minimally interfere (if at all) with manufacturing productivity, such that plate installation, for example, require no welding on line and plates drop into place without measuring or fixturing for location.

Figure 3:
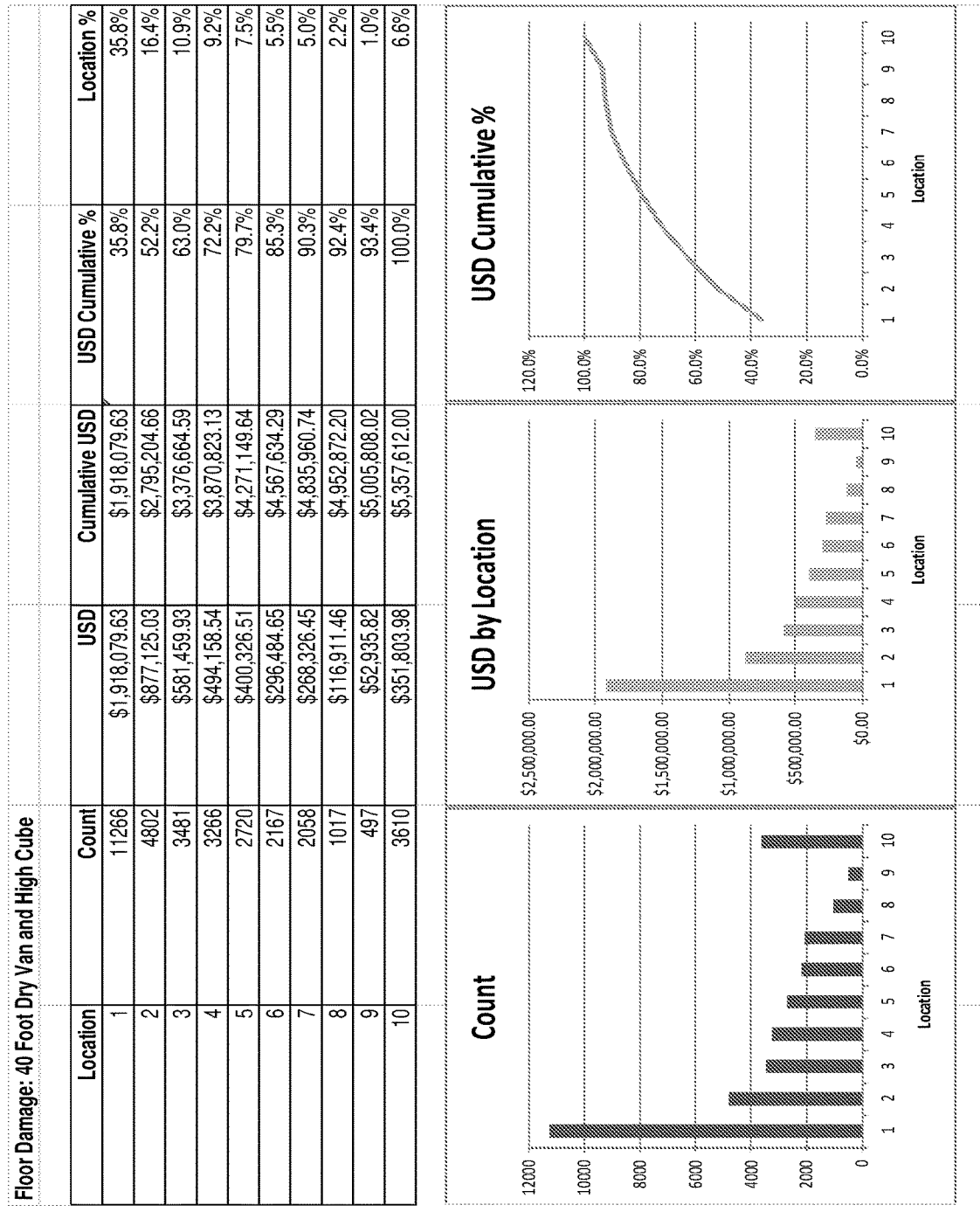
FIG. 3 illustrates research findings associated with damage to floorings in containers.

As discussed above, floor damage costs may be analyzed to identify the distribution of cost by longitudinal location in containers. FIG. 3 illustrates research findings associated with damage to floorings in containers. In FIG. 3, the "Location" column can indicate a particular area of the container floor (e.g., each location identifies 10% the length of a container). Location 1 can correspond to an area between 0 and 4 feet away in longitudinal distance (e.g., lengthwise) from an entrance door of a 40' foot container. Location 2 can correspond to an area between 4 and 8 feet away from the entrance door. Location 3 can correspond to an area between 8 and 12 feet away from the entrance door, and so forth. The "Count" column can show the number of times a particular Location of the container floor has been damaged. The "USD" column can show the amount of monetary costs due to damage to a particular Location. The "Cumulative USD" column can show the total amount of monetary costs due to damage at a particular Location as well as those Locations from the container entrance leading to the particular Location. The "USD Cumulative %" column can show percentages of the total costs due to damage at a particular Location as well as those Locations from the container entrance leading to the particular Location. The "Location %" column can indicate the percentages of damage occurrences for a particular Location.

Also shown in FIG. 3 are three charts. The "Count" chart illustrates, in bar chart form, the number of times each Location of the container floor has been damaged. The "USD by Location" chart illustrates, in bar chart form, the amount of monetary costs attributed to damage at each Location. The "USD Cumulative %" chart illustrates, in line graph form, the percentages of the total costs due to damage at each particular Location and at all Locations previous to a respective particular Location.

Based on the information contained in the tables of FIG. 3, 52.2% of all damage of a shipping container floor occurs in the first 20% of a container in front of the entrance.

Forklift loading practices may also be studied to determine the most common travel paths at the door end of containers. The size of a forklift can be a factor in the maneuverability of the forklift and its wheels in a container, which can be narrow. It can be reasoned that a large, heavy forklift, such as one weighing over 24,000 lbs., has limited mobility in an 8 feet wide container. Moreover, the wheels of a forklift usually enter the container at the center of the container door, then "veer" to the right or left to deposit or retrieve the forklift's load. This pattern can then be reversed when exiting the container. These movement patterns have been substantiated through observation. The container floor can experience forklift wheel traffic substantially confined to a fairly well defined area. In some cases, the forklift or truck wheel track/trace can be easily seen or readily observed. In some instances, forklift tracks can be seen as darker streaks on a container floor. Accordingly, a solution for protecting the container flooring can be focused on or targeted at a fairly well defined area or route on the container floor.

Based on research (e.g., analysis, observation, experimentation, etc.), a large number of forklifts have track widths (e.g., front center to center) approximately ranging from 1000 mm (39.37 inches) to 1150 mm (50.39 inches), front tire widths approximately ranging from 180 mm (7.09 inches) to 300 mm (11.81 inches), rear tire widths approximately ranging from 165 mm (6.50 inches) to 250 mm (9.84 inches), empty weight measurements approximately ranging from 3730 kg to 7143 kg, and loaded weight measurements approximately ranging from 6230 kg to 11678 kg. Moreover, it can be determined that a popular, common, or average track width is approximately 44 inches and that a popular, common, or average tire width is approximately 10 inches. This and other information can be utilized throughout various embodiments described herein.

Figure 4:
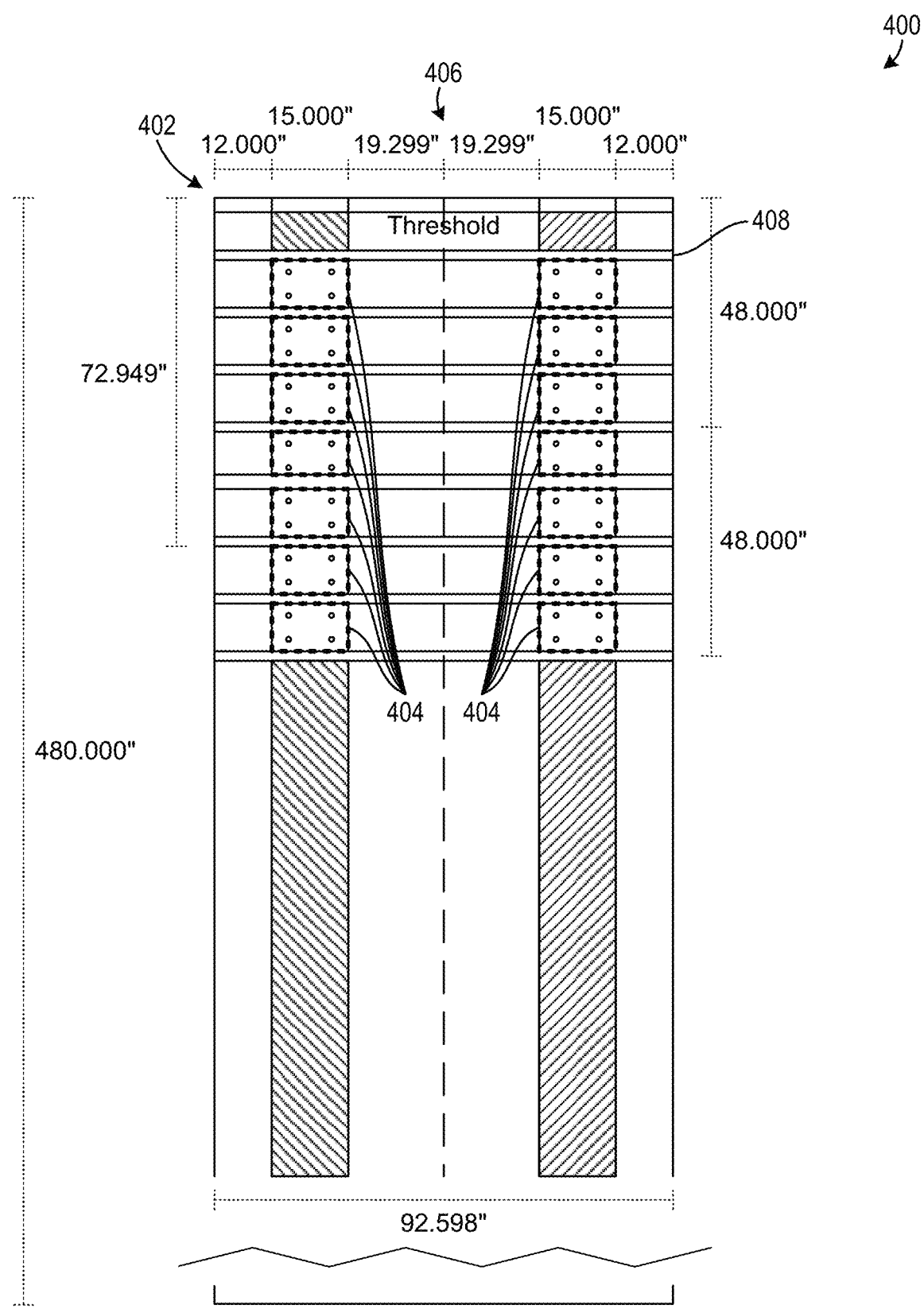
FIG. 4 illustrates a top view of an example shipping container floor having implemented support panels in some embodiments.

FIG. 4 illustrates a top view 400 of an example shipping container floor 402 having implemented support panels 404 in some embodiments. In the example of FIG. 4, the shipping container corresponds to a 40 feet container (i.e., 40 feet in length/longitude). An entrance to the shipping container is located at the front 406 of the shipping container.

In some embodiments, based on at least some of the above researching findings and/or other data, particular areas on the container floor can be selected to be reinforced or supported. As discussed previously, a significant amount of damage to container floors occurs near the entrance to the container where forklifts usually enter and exit the container. Moreover, as discussed above, damage to the container floors can be caused by the wheels of the forklifts carrying loads. As such, particular areas on the container floor that likely correspond to forklift wheel traces or tracks can be selected to be reinforced or supported, as opposed to reinforcing other floor areas and/or the entire floor which can waste substantial amounts of money, time, effort, and/or other resources. Accordingly, support panels (e.g., supporting panels, reinforcing panels, reinforcement panels, support plates, reinforcing plates, or the like) 404 may be placed in particular areas that tend to experience significant traffic and/or that likely correspond to forklift wheel traces or tracks near the entrance of the container. When forklift wheels drive over the wood flooring in the container, support panels placed underneath the wood flooring can help alleviate some of the stress or load that would otherwise be incurred by the wood flooring.

As shown in FIG. 4, there are two paths along the length of the container where support panels 404 are placed. The two paths proximate the track or trace of forklift wheels. Based on the above research and/or other factors, it can be determined that the each support panel 404 may be placed, for example, 19.299 inches away in transversal distance from the center length of the container. Those skilled in the art will appreciate that the support panel 404 may be placed 17, 18, 19, 20, 21, or 22 inches away in transversal distance from the center length of the container. In some embodiments, there support panel 404 may be placed any distance aware from the transversal distance from the center length of the container. Moreover, it can be determined that each support panel 404 may have a transversal width of 15.000 inches. Those skilled in the art will appreciate that the support panel 404 have a transversal width of 12, 13, 14, 16, 17, or 18 inches. In some embodiments, there support panel 404 may have any have a transversal width. Further, those skilled in the art will appreciate that the support panel 404 placement and width may be based on the length and width of the shipping container.

In the example of FIG. 4, the shipping container is 40 feet (480.000 inches) long and nearly 8 feet (92.598 inches) wide. Based on research, it may be determined that support panels 404 should be placed or implemented preferably between 0 to 8 feet from the entrance or door of the container (i.e., where 52.2% of damage occurs based on tables in FIG. 3). In some embodiments, a steel threshold may extends lengthwise from the front 406 to, for example, the first (rearmost) cross-member 408. In this example, there are a total of 14 support panels 404 in two paths within 8 feet from the container entrance (the steel threshold and 6 panels in the 0 to 4 feet area and 8 panels in the 4 to 8 feet area). Other variations are also possible. For example, in some cases, a shipping container can be 20 feet long. As such, the support panels may be placed in two paths within 4 feet from the entrance of the 20 feet container, resulting in 6 total support panels (a steel threshold and 2 panels in the 0 to 2 feet area and 4 panels in the 2 to 4 feet area).

Figure 5:
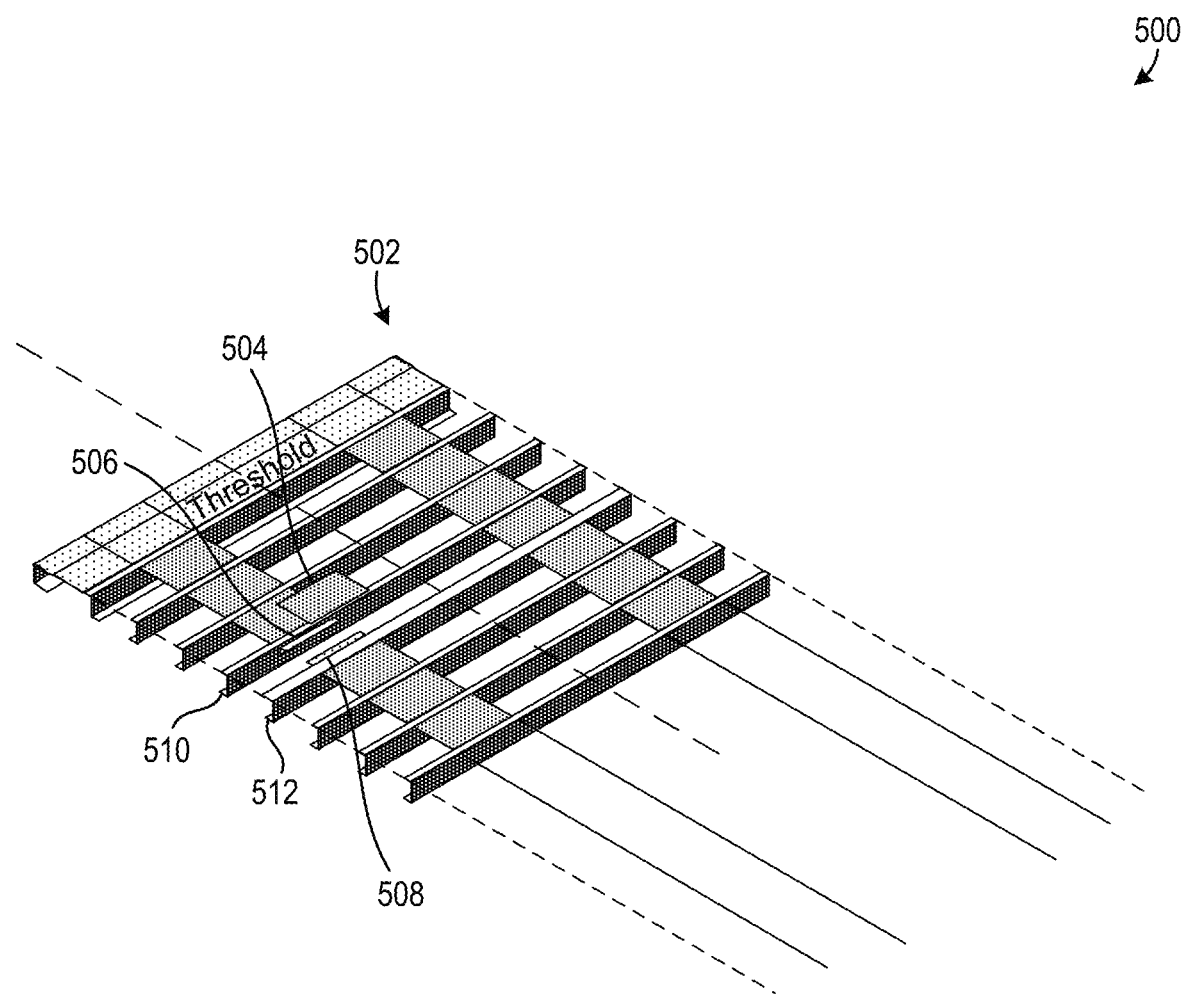
FIG. 5 illustrates an example system including support panels and ledgers configured to provide protection of floorings in shipping containers in some embodiments.

FIG. 5 illustrates an example system 500 including support panels and ledgers configured to provide protection of floorings in shipping containers in some embodiments. The example system 500 can include a foundational base assembly 502, such as a floor in a shipping container.

The foundational base assembly (e.g., floor) 502 can include a plurality of support beams. In some implementations, the support beams can correspond to cross-members, such as I-beam cross-members, C-beam cross-members, cross-members with rectangular cross sections, and/or cross-members with solid cross sections, etc. In the example of FIG. 5, the plurality of support beams included in the foundational base assembly 502 can correspond to a plurality of C-beam cross-members (e.g., which may be manufactured from steel). Furthermore, a wood flooring (not illustrated in FIG. 5) may be overlaid on the plurality of C-beam cross-members to form the foundational base assembly 502.

Moreover, as shown in FIG. 5, a plurality of support panels can be implemented in conjunction with or as a part of the foundational base assembly 502. In some embodiments, a support panel 504 can be placed on top of ledgers 506 and 508. Ledger 506 can be attached to a first support beam, such as a first C-beam cross-member 510. Ledger 508 can be attached to a second support beam, such as a second C-beam cross-member 512. When a load such as a force from a forklift wheel is applied to the wood flooring overlaying the support panel 502, the support panel 502 can absorb at least some of the stress and can distribute some of the stress to the ledgers 506 and 508, which can further distribute some of the stress to the cross-members 510 and 512, respectively. Any portion of the foundational base assembly 502 may comprise support panels.

Although FIG. 5 depicts support panels 504 being placed on top of ledgers 506 and 508, in some embodiments, one or more support panels are coupled to the first support beam (e.g., C-beam cross member 510) and/or the second support beam (e.g., C-beam cross member 512) without the use of one or more ledgers. For example, the support panel 504 may be welded (or otherwise attached) to the first support beam and/or the second support beam without the use of one or either ledger 506 or 508. In some embodiments, the first support beam may be formed with a support panel (e.g., during fabrication of the first support beam, the support panel was formed). In some embodiments, the support beams and a support panel may be formed together during fabrication.

Although ledgers 504 and 506 are depicted in FIG. 5, each ledger may be of any shape. In some embodiments, ledger 504 and/or 506 may be of any shape. The ledger 504 and/or 506 may be of any size or length. Further, in some embodiments, a portion of the ledger 504 and/or 506 that supports the support panel 506 may not necessarily be flat.

Figure 6:
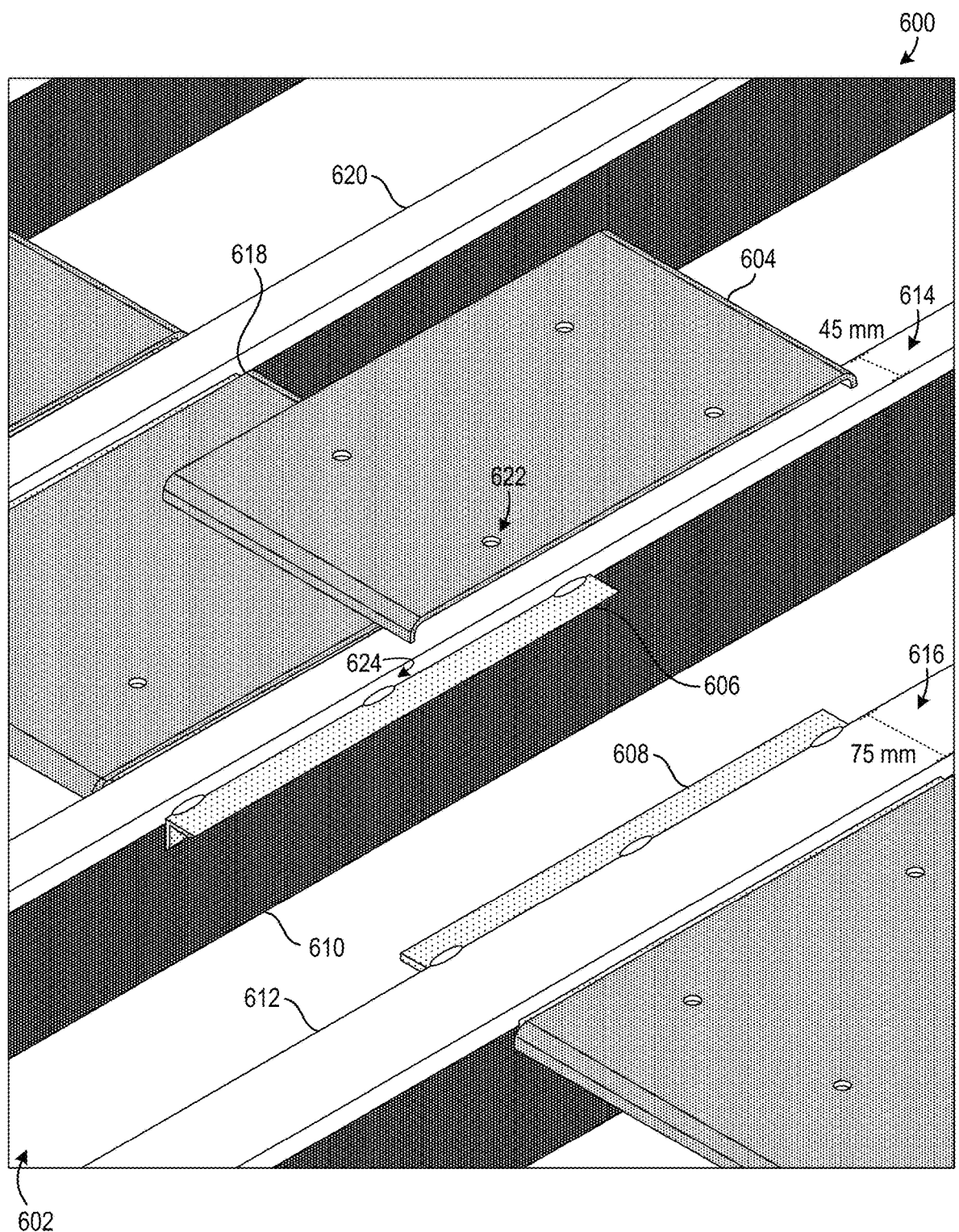
FIG. 6 illustrates a zoomed-in view of an example system including support panels and ledgers configured to provide protection of floorings in some embodiments.

With reference to FIG. 6, a zoomed-in view of an example system 600 including support panels and ledgers configured to provide protection of floorings is illustrated in some embodiments. The example system 600 may include a foundational base assembly, such as a floor 602.

The floor 602 can be built using a plurality of support beams, such as C-beam cross-members, as shown in FIG. 6. The floor 602 can be fitted with a plurality of support panels, which can help protect (e.g., support, strengthen, reinforce, make durable, or the like) a wood flooring (not illustrated in FIG. 6) which may be placed on top of the support panels. In FIG. 6, a first support panel 604 may be placed on top of a first ledger 606 and a second ledger 608. The first ledger 606 can be attached (e.g., laid or set over, welded, adhered, or un-adhered) to a flat vertical side of a first C-beam cross-member 610. The second ledger 608 can be attached (e.g., laid or set over, welded, adhered, or un-adhered) to an underside of a top flange of a second C-beam cross-member 612. Thus, when all or a portion of a forklift wheel passes over the wood flooring overlaying the first support panel 604, the first support panel 604 may protect the wood flooring by alleviating at least some of the stress exerted by the forklift wheel onto the wood flooring. The first support panel 604 may distribute or dissipate at least some of the stress to the ledgers 606 and 608, and also to the cross-members 610 and 612.

In some embodiments, the support beams may differ from one another. For example, the top flanges of different C-beam cross-members may differ. As shown in FIG. 6, cross-member 610 can have a top flange 614 with a longitudinal length of 45 mm, whereas cross-member 612 can have a top flange 616 with a longitudinal length of 75 mm. However, in some cases, the distance between cross-members (including cross-members with different top flanges) may be retained, such as at 11.81 inches or 300 mm.

It thus follows that support panel 604 can have a shorter longitudinal length than support panel 618, because support panel 604 is in between cross-member 610 and cross-member 612, and cross-member 612 has a longer top flange 616. In some implementations, support panels (e.g., 604) that are intended to be placed in between a 45 mm top flange cross-member (e.g., 610) and a 75 mm top flange cross-member (e.g., 612) can all have a same first longitudinal length (shorter), whereas support panels (e.g., 618) that are intended to be placed in between two 45 mm top flange cross-members (e.g., 610 and 620) can all have a same second longitudinal length (longer). As such, there can be two sets of support panels to be manufactured. The first set can have a particular standardized longitudinal length and the second set can have a different standardized longitudinal length. Those skilled in the art will appreciate that, in some embodiments, any or all support panels may be of different size and/or length.

In some implementations, the wood flooring overlaying a support panel can be fastened onto the support panel. In the example of FIG. 6, the support panels can have screw holes (e.g., 622) such that the wood flooring can be screwed into the screw holes of the support panel. In some embodiments, the support panels do not have screw holes. In one example, wood floorings are overlaid on top of the support panels and screws and/or screw holes are drilled through the wood flooring and the support panels thereafter.

The ledgers may be attached or secured to the cross-members. In one example, the ledgers can be attached to the cross-members by spot welding (e.g., spot weld 624). Details regarding the building and attaching of the ledgers will be discussed below.

Figure 7A:
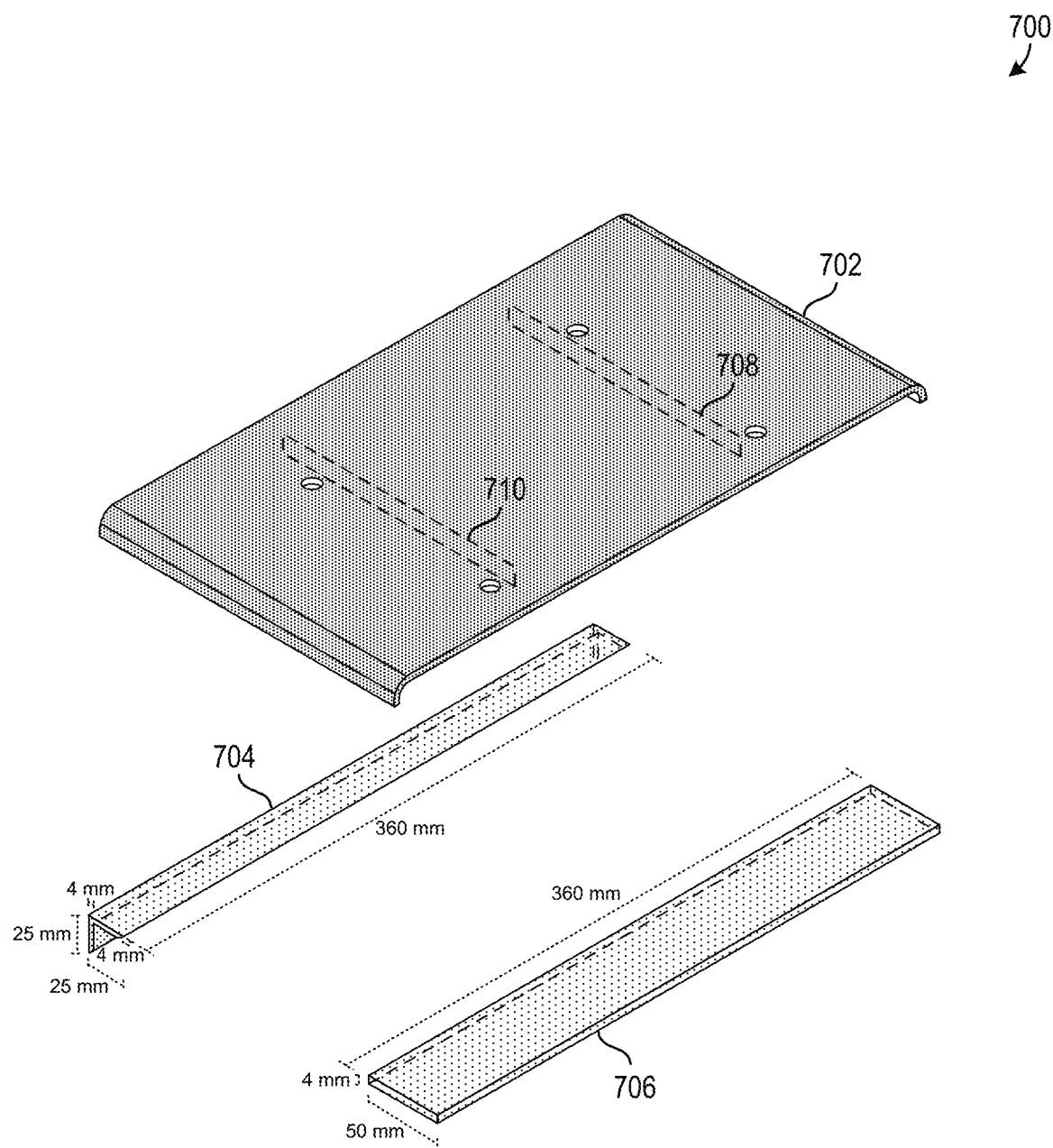
FIG. 7A illustrates an example system including a support panel and ledgers configured to provide protection of floorings in some embodiments.

FIG. 7A illustrates an example system 700 including a support panel 702 and ledgers 704 and 706 configured to provide protection of floorings in some embodiments. As discussed above, the support panel 702 can be placed on top of the ledgers 704 and 706, and each ledger can be attached to a respective support beam of a foundational base assembly (e.g., a respective cross-member of a floor in a shipping container). An upper flooring, such as a hardwood flooring, can be placed over the support panel 702. When a load is placed on the flooring (e.g., a forklift carrying a load drives over a portion of the flooring), the support panel 702 may assist to absorb and distribute stress or force caused by the load (and carrying vehicle if present).

As shown in FIG. 7A, the first ledger 704 can correspond to an angle ledger and the second ledger 706 can correspond to a flat bar ledger or flat ledger. It is contemplated that other variations are also possible (e.g., any number of angle ledgers, any number of flat bar ledgers, ledgers of different size, ledgers of different shape, or different ledgers that may work in combination with the one or more support panels). In some implementations, each of the first and second ledgers 704 and 706 can include at least one of an angle ledger, a flat ledger, a ledger having a rectangular cross section, a ledger having a triangular cross section, a ledger having a round cross section, a ledger having a solid cross section, or the like.

As discussed above, research and analysis such as FEA modeling can be used to optimize reinforcing/support plate design weight and stiffness such that maximum support is obtained in the floor areas of interest (e.g., the floor areas that are likely to incur significant traffic or heavy loads). Based on the research and analysis, the support panels 702 may be 4 mm thick in some embodiments. In various embodiments, the support panels 702 may have any thickness and/or varying thickness. For example, the support panels 702 may be approximately 5 mm thick, 6 mm thick, 3 mm thick, 2 mm thick or the like.

Research and analysis can also be used to determine other dimensions as well. In the example of FIG. 7A, the angle ledger 704 may have, for example, leg lengths of 25 mm and 25 mm, a thickness of 4 mm, and a transversal width of 360 mm. In this example, the flat ledger 706 can have a longitudinal length of 50 mm, a thickness of 4 mm, and a transversal width of 360 mm. Other variations are also possible (e.g., different transversal width, different longitudinal length, and different leg lengths). For example, the angle ledger 704 may have thickness of approximately 2 mm-8 mm in thickness, have leg lengths of approximately 15 mm-40 mm, and a transversal width of approximately 300-420 mm. In another example, the flat ledger 706 may have thickness of approximately 2 mm-8 mm in thickness, have longitudinal length of approximately 30-70 mm, and a transversal width of approximately 300-420 mm Furthermore, in some implementations, the support panel 702 can include one or more strengthening elements. In the example of FIG. 7A, the support panel 702 can include two flat bars 708 and 710 coupled on edge to the main body of the support panel 702. The two flat bars 708 and 710 can strengthen, support, and/or stiffen the physical structure of the support panel 702. Any design, shape, size of strengthening elements may be utilized. In some embodiments, the support panel 702 does not include strengthening elements.

Figure 7B:
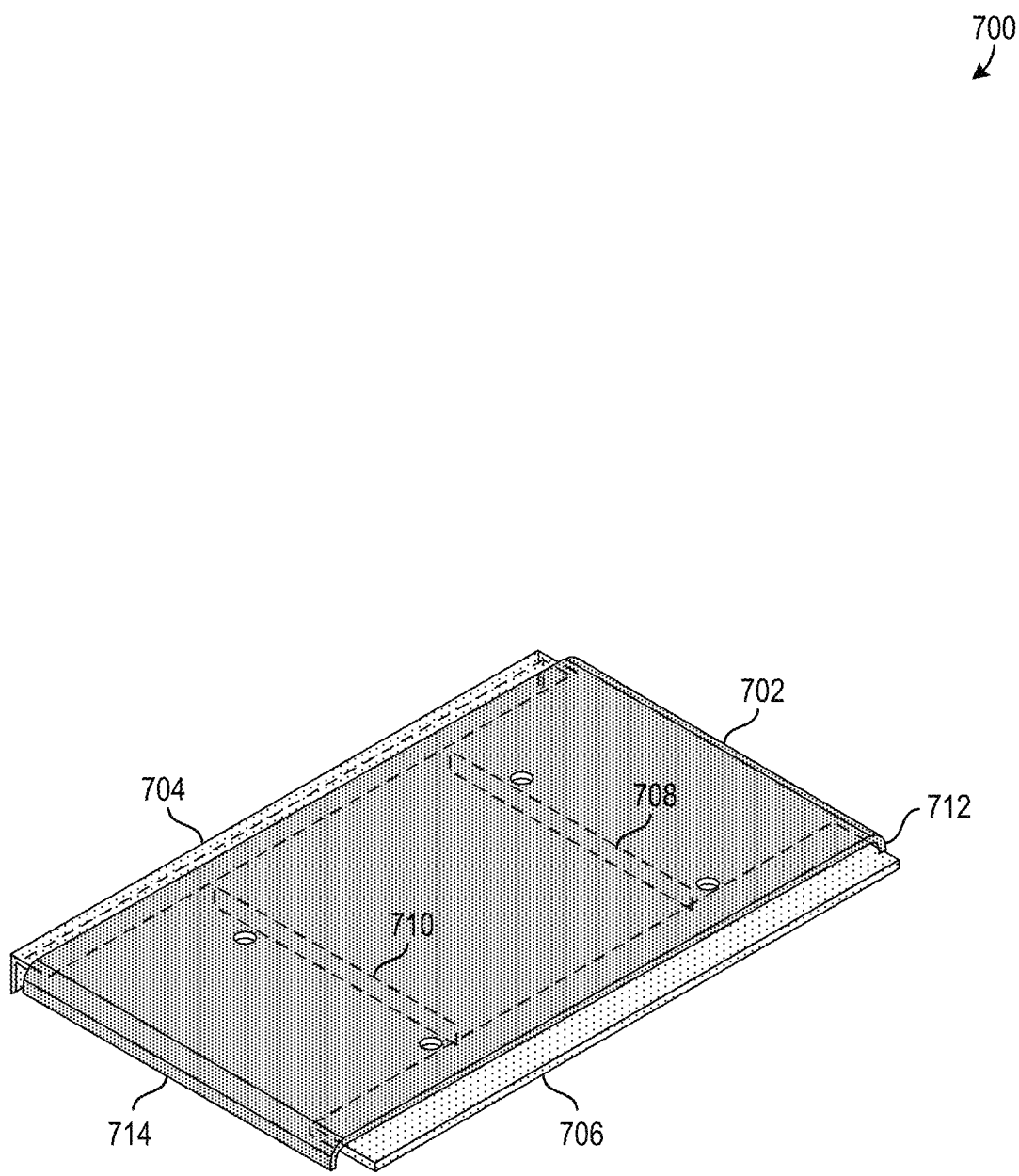
FIG. 7B illustrates the example system of FIG. 7A in which the support panel is placed on the ledgers to provide protection of floorings in some embodiments.

FIG. 7B illustrates the example system 700 of FIG. 7A in which the support panel 702 is placed on the ledgers (e.g., angle ledger 704 and flat ledger 706) to provide protection of floorings in some embodiments. The ledgers 704 and 706 can be attached to support beams (not illustrated in FIG. 7B). In the example of FIG. 7B, the support panel 702 can include two flat bars 708 and 710 that stiffen or strengthen the support panel 702.

In some cases, container manufacturing methods can be studied and taken into consideration, and the support panels can be designed to reduce or eliminate interference with container manufacturing productivity. In some embodiments, the support panels can be designed to be readily placed in between two support beams (e.g., two cross-members of a shipping container). In the example of FIG. 7B, the support panel 702 can be placed on a portion of the angle ledger 704 and a portion of the flat ledger 706 in between two support beams, without having to attach or secure the panel 702 to the ledgers 704 and 706. In some embodiments, the support panel 702 can be dropped in without having to weld or fasten the panel 702 onto the ledgers 704 and 706 and without measuring or fixturing the panel 702 for location. In various embodiments, the support panel 702 is attached to the ledger 704, the ledger 706, and/or one or more cross members.

In some implementations, the support panel 702 can include two lips or flanges (e.g., 712 and 714) that extend downward to help prevent or reduce movement or sliding of the panel 702 on top of the ledgers 704 and 706, as shown in FIG. 7B. In some implementations, the support panel 702 can correspond to a flat piece without the two lips or flanges.

Furthermore, the two flat bars 708 and 710 can be designed to have longitudinal lengths that fit in between the two ledgers 704 and 706. This can enable the support panel 702 including the flat bars 708 and 710 to be readily dropped in or placed on the ledgers 704 and 706 in between two support beams (not illustrated in FIG. 7B). Another purpose of the flat bars 708 and 710 can be to help prevent or reduce movement or sliding of the panel 702 on top of the ledgers 704 and 706.

Figure 8A:
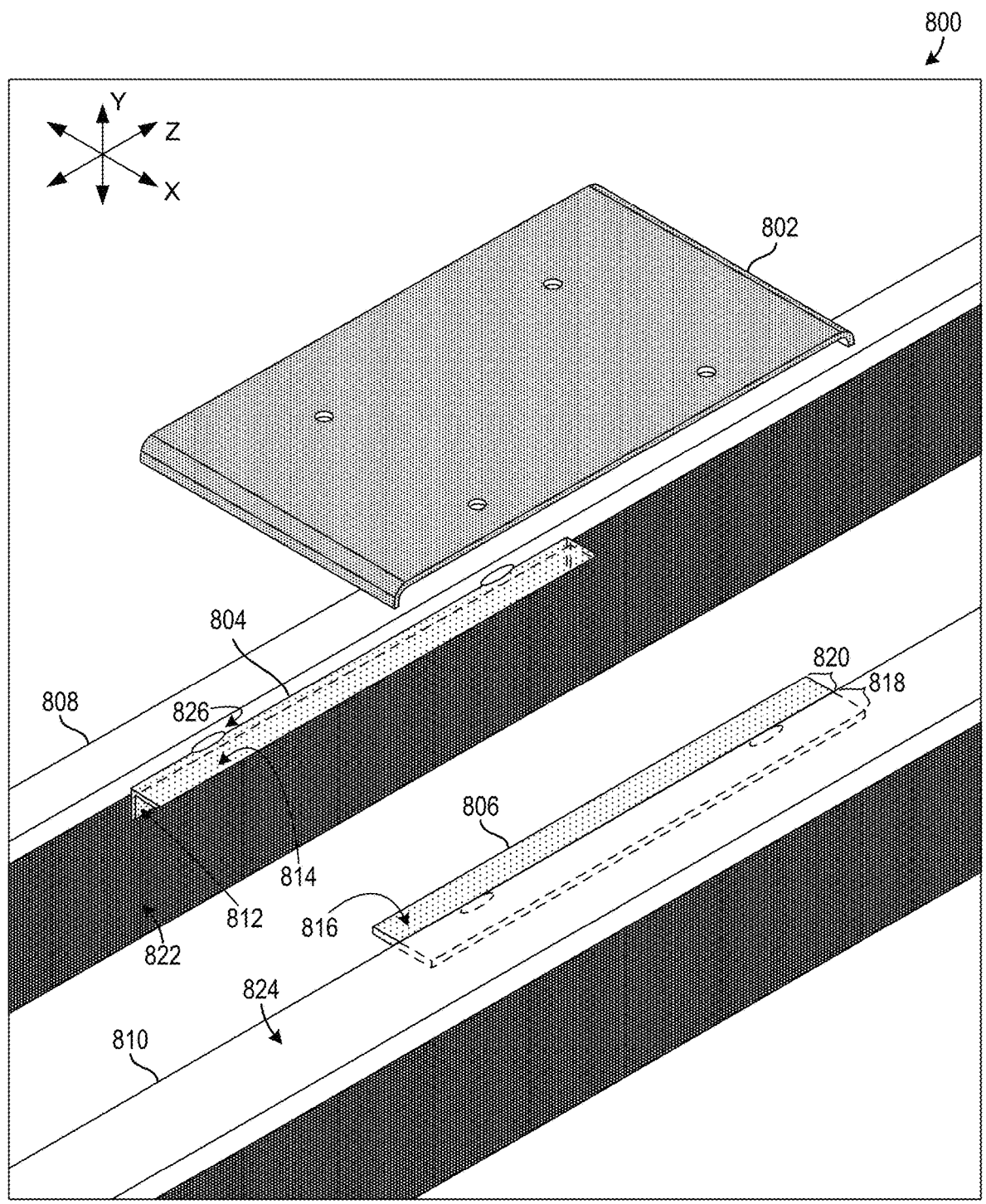
FIG. 8A illustrates an example system including a support panel as well as ledgers that are attached to support beams in some embodiments.

FIG. 8A illustrates an example system 800 including a support panel 802 as well as ledgers 804 and 806 that are attached to support beams 808 and 810 in some embodiments. In this example, the support beams 808 and 810 can correspond to C-beam cross-members in a shipping container. Other components are omitted for graphical purposes.

In some embodiments, the first ledger 804 corresponds to an angle ledger and the second ledger 806 corresponds to a flat bar ledger or flat ledger. The angle ledger 804 includes a first plane 812 and a second plane 814 connected perpendicularly along edges of the first and second planes. The first plane 812 may attach to an upper portion of the first support beam 808. For example, the first plane 812 may be attached or secured to an upper portion of a vertical flat side 822 of the first support beam 808. The second plane 814 may protrude in a horizontal direction (X-axis) from the upper portion (e.g., the upper portion of the vertical flat side 822) of the first support beam 808.

Further, the flat ledger 806 may include a third plane 816. A first portion 818 of the third plane 816 may be attached to an upper portion of the second support beam 810. For example, the first portion 818 may be attached or secured to an underside of a top flange portion 824 of the second support beam 810 (e.g., a C-beam cross-member). The second portion 820 of the third plane 816 may protrude in the horizontal direction (X-axis) from the upper portion (e.g., top flange 824) of the second support beam 810.

In some implementations, the ledgers 804 and 806 are attached to the first and second support beams 808 and 810 via spot welding. As shown in example of FIG. 8A, there can be one or more spot welds (e.g., 826) that attach, hold, or secure the ledgers 804 and 806 to the first and second support beams 808 and 810, respectively. Additionally or alternatively, stitch welding can be used in some embodiments. For example, the second portion 820 of the third plane 816 of the flat ledger 806 can be stitch welded underneath the top flange portion 824 of the second support beam 810. In another example, the first plane 812 of the angle ledger 804 can be stitch welded to the upper portion of the vertical flat side 822 of the first support beam 808. The ledgers 804 and 806 may be attached to the first and second support beams 808 and 810 in any ways or combination of ways.

In some instances, ledgers can be built in association with the building of support beams (e.g., cross-members). In some cases, ledgers can be attached to the support beams at or before the base assembly stage. After the foundational base assembly is formed using a plurality of support beams (with attached ledgers), the support panels can be placed onto the ledgers at or prior to the wood flooring being overlaid.

In various embodiments, support beams may be fabricated or formed including all or parts of one or more ledgers. In this example, a ledger may not be added to a support beam in a separate step (e.g., by welding) but rather one or more ledgers may be formed when the support beam is formed. In some embodiments, additional ledgers or portions of ledgers may be added to a support beam that was formed with at least one ledger or a portion of a ledger.

In some embodiments, the support panel, the ledgers, and/or other relevant pieces can be made from one or more sheared pieces of steel plate, a standard-cut flat bar, and/or an angle piece. In some embodiments, the support panel, the ledgers, and/or other relevant pieces can be made from steel or any other material (e.g., combination of metals).

Figure 8B:
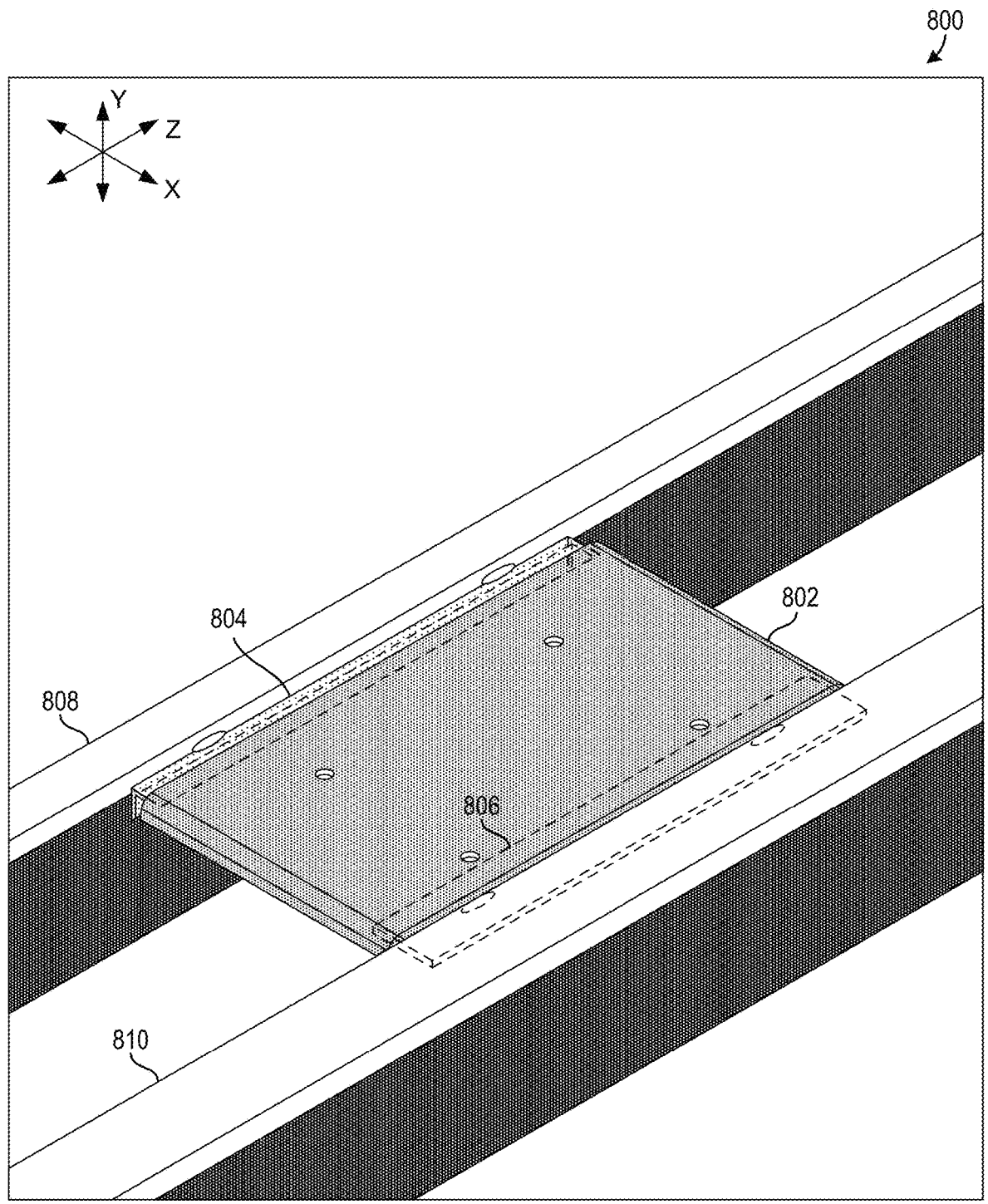
FIG. 8B illustrates the example system of FIG. 8A in which the support panel is placed on the ledgers that are attached to the support beams in some embodiments.

FIG. 8B illustrates the example system 800 of FIG. 8A in which the support panel 802 is placed on the ledgers 804 and 806 that are attached to the support beams 808 and 810, respectively in some embodiments. As discussed before, in some implementations, the support panel 802 can be dropped-in or place onto the ledgers 804 and 806 in between the support beams 808 and 810, without having to attach, fasten, or otherwise secure the support panel 802 to the ledgers 804 and 806. However, in some cases, the support panel 802 can be attached, fastened, and/or secured to the ledgers 804 and 806 as needed.

Figure 8C:
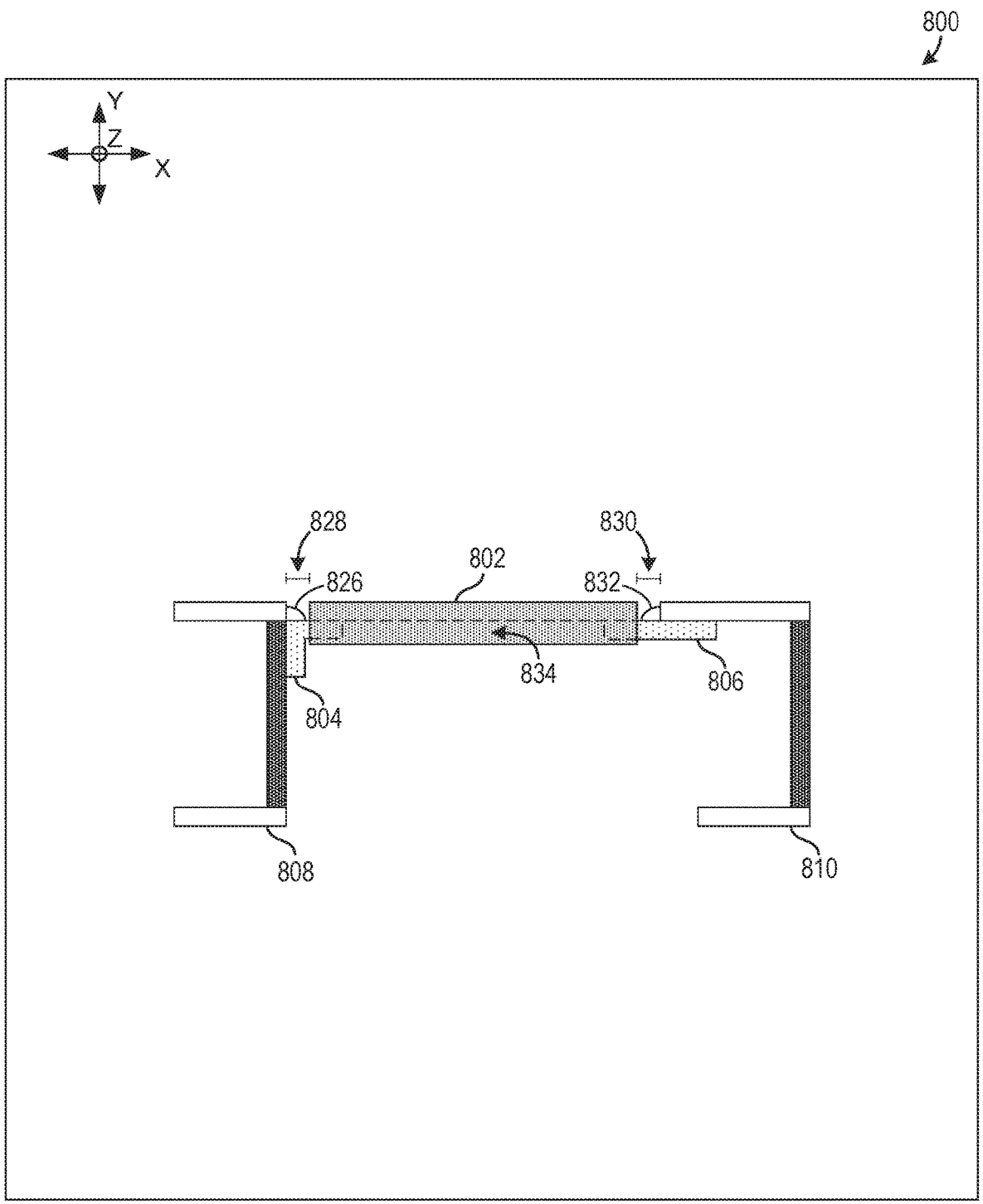
FIG. 8C illustrates a side view of the example system of FIG. 8A and FIG. 8B in which the support panel is placed on the ledgers that are attached to the support beams in some embodiments.

FIG. 8C illustrates a side view of the example system 800 of FIG. 8A and FIG. 8B in which the support panel 802 is placed on the ledgers 804 and 806 that are attached to the support beams 808 and 810 in some embodiments. In the example of FIG. 8C, one or more first spot welds 826 can attach the first ledger 804 (e.g., an angle ledger) to the first support beam 808, such as by welding the angle ledger 804 to an upper portion of a vertical flat side of the first support beam 808 (e.g., a first C-beam cross-member). Also, as shown in this example, one or more second spot welds 832 can attach the second ledger 806 (e.g., a flat ledger) to the second support beam 810, such as by welding the flat ledger 806 underneath an upper flange portion of the second support beam 810 (e.g., a second C-beam cross-member next to the first C-beam cross-member).

Further, as shown in FIG. 8C, there can be a gap 828 between the first support beam 808 and the support panel 802 and/or a gap 830 between the second support beam 810 and the support panel 802. The gaps 828 and 830 can allow for some deviations or inaccuracies in the dimensions of the support panel 802, ledgers 804 and 806, and/or other pieces. The gaps 828 and 818 can provide some "wiggle room" for placing the support panel 802 onto the ledgers 804 and 806 in between the support beams 808 and 810. The gaps 828 and 830 can also be sufficiently small so as to reduce or prevent undesired longitudinal (i.e., along X-axis) sliding or movement of the support panel 802 on the ledgers 804 and 806. In some embodiments, the gaps 828 and 830 can also eliminate the need to dress the spot welds 826 and 832, respectively.

In some embodiments, the support panel 802 can also have lips or flanges (e.g., 834) that extend downward. The lips or flanges can help reduce or prevent undesired transversal (i.e., along Z-axis) sliding or movement of the support panel 802 on the ledgers 804 and 806.

Figure 8D:
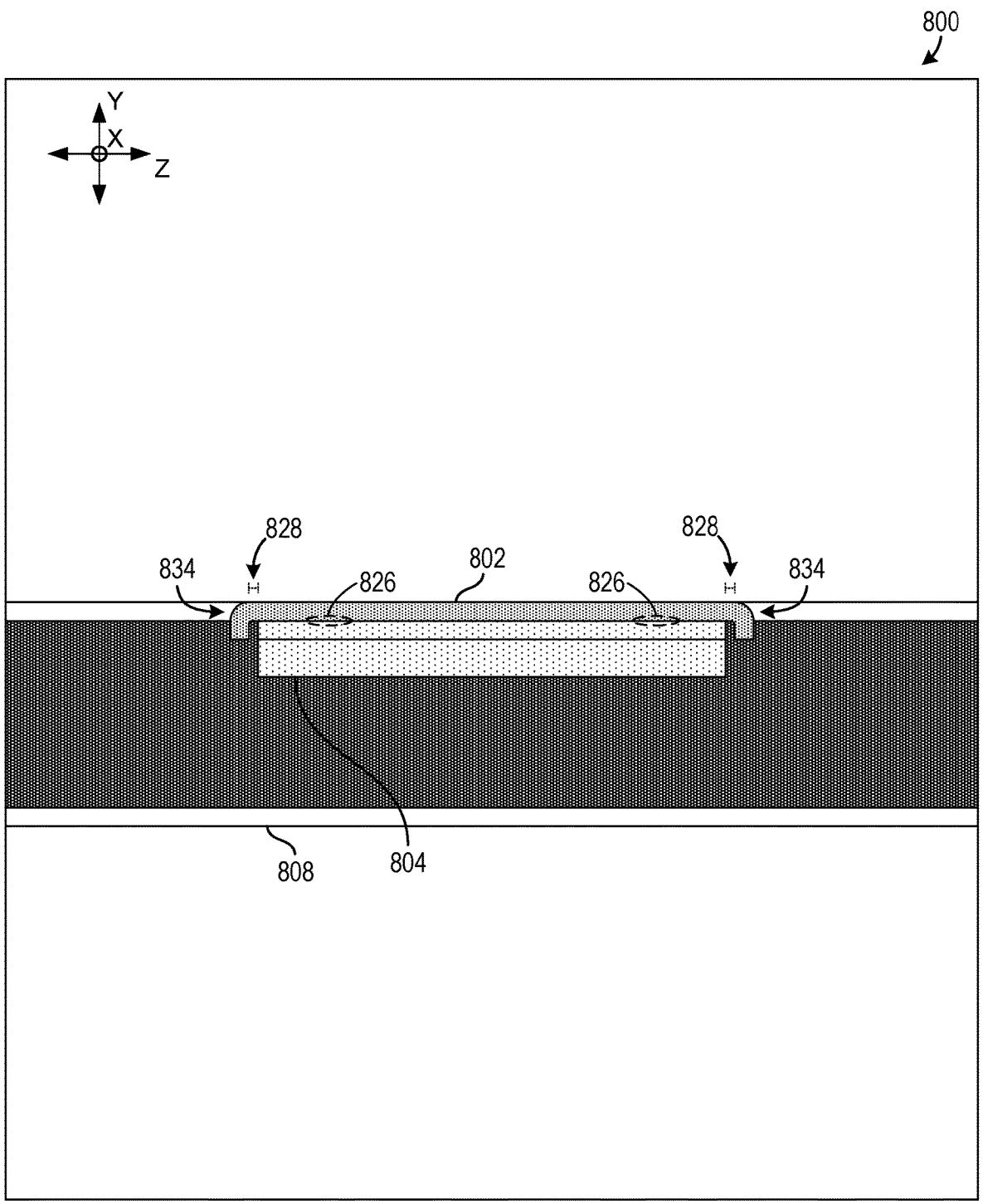
FIG. 8D illustrates a frontal view of the example system of FIG. 8A, FIG. 8B, and FIG. 8C in which the support panel is placed on the ledgers that are attached to the support beams in some embodiments.

FIG. 8D illustrates a frontal view the example system 800 of FIG. 8A, FIG. 8B, and FIG. 8C in which the support panel 802 is placed on the ledgers that are attached to the support beams in some embodiments. In FIG. 8D, the angle ledger 804 and the first support beam 808 are illustrated, but the flat ledger and the second support beam are omitted for graphical purposes.

Again, in some embodiments, the angle ledger 804 can be attached to the first support beam 808 via one or more spot welds 812. Also, in some implementations, the support panel 802 can have lips or flanges 820 that extend downward, as shown in FIG. 8D. The lips or flanges 820 can help reduce or prevent undesired transversal (i.e., along Z-axis) sliding or movement of the support panel 802 on the ledgers.

Further, there can be one or more gaps 822 between the lips or flanges 820 of the support panel 802 and the ledgers. In some cases, the gaps 822 can allow for some deviations or inaccuracies in the dimensions of the support panel 802, ledgers, and/or other pieces. The gaps 822 can provide some "wiggle room" for placing the support panel 802 onto the ledgers in between the support beams. The gaps 822 can also be sufficiently small so as to reduce or prevent undesired transversal (i.e., along Z-axis) sliding or movement of the support panel 802 on the ledgers.

Figure 9:
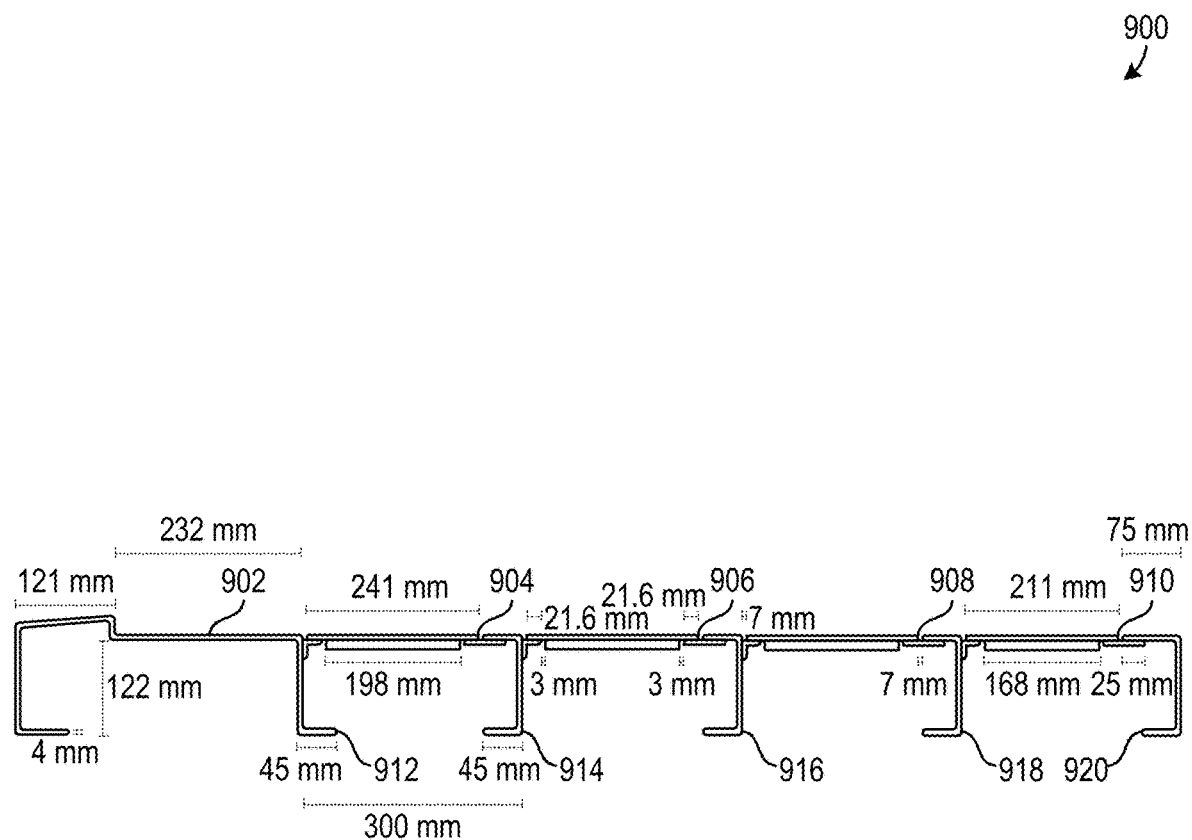
FIG. 9 illustrates a side view section of an example foundational base assembly having implemented support panels in some embodiments.

FIG. 9 illustrates a side view section of an example foundational base assembly 900 having implemented support panels in some embodiments. The example foundational base assembly 900 can, for example, correspond to a floor, such as shipping container floor. The example foundational base assembly 900 can include a threshold 902, a plurality of support panels (e.g., 904, 906, 908, 910, etc.) for protecting a flooring overlay, a plurality of support beams (e.g., 912, 914, 916, 918, 920, etc.), and a plurality of ledgers attached to the plurality of support beams.

As shown in the example of FIG. 9, each support panel can be placed on a respective angle ledger and a respective flat ledger. Each ledger can be attached or secured to an upper portion of a respective support beam. In FIG. 9, at least some of the support beams can include cross-members, such as C-beam cross-members.

In some instances, support beams can be different. For example, C-beam cross-member 920 can be different from C-beam cross-members 914, 916, and 918 because C-beam cross-member 920 has a larger upper flange portion than the upper flange portions of the other C-beam cross-members 914, 916, and 918. It follows that support panel 910 can have a shorter longitudinal length than the longitudinal lengths of the other support panels 904, 906, and 908. Accordingly, at least two separate sets of support panels can be manufactured, one set for support panels similar to panels 904, 906, and 908 and another set for support panels similar to panel 910.

Further, dimensions of various pieces and components of the disclosed technology are presented in FIG. 9. In some instances, at least some of the dimensions can be determined or planned based on research and analysis. In some cases, at least some of these dimensions have been determined by research or analysis to be suitable for implementing various embodiments of the disclosed technology. However, it should be understood that these dimensions are exemplary and that other dimensions and/or variations can be utilized as well. Moreover, it should be appreciated that, similar to other figures presented herein, FIG. 9 is not necessarily drawn to scale.

Figure 10:
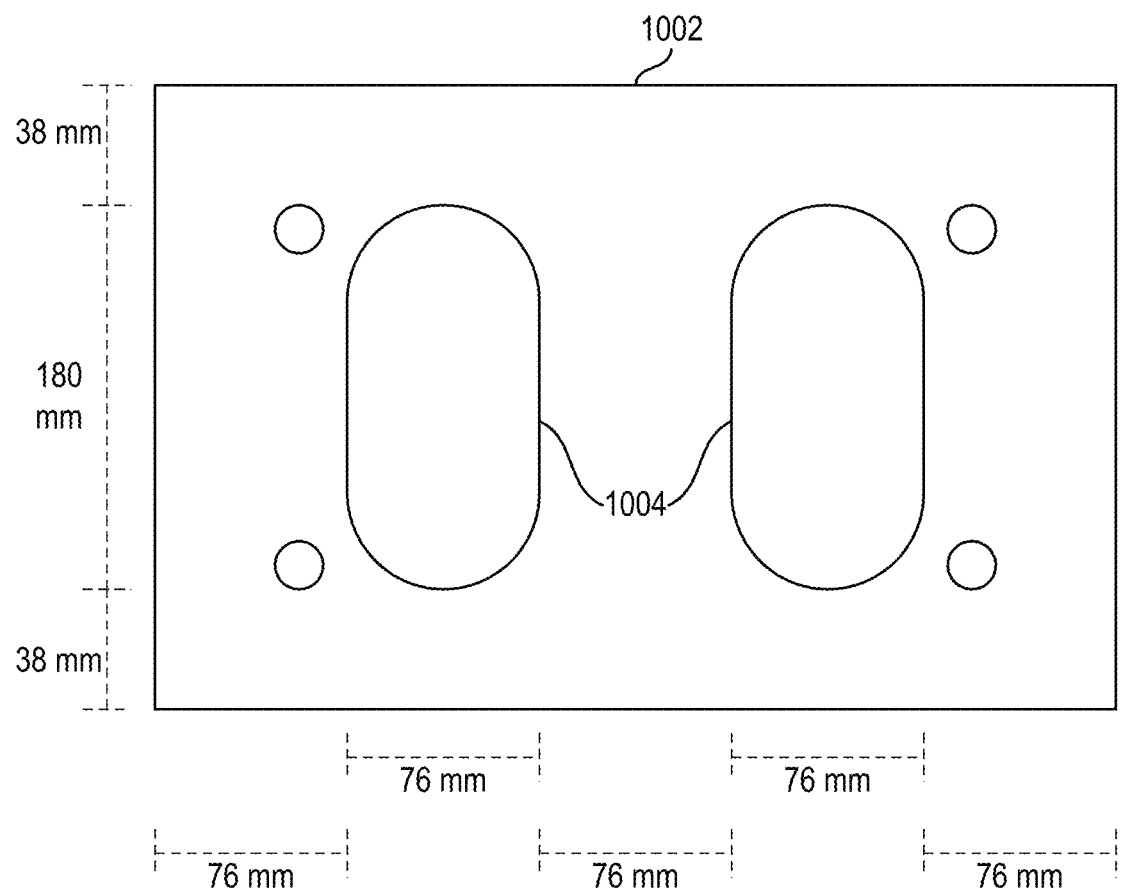
FIG. 10 illustrates an example support panel with material removed to reduce weight in some embodiments.

FIG. 10 illustrates an example support panel 1002 with material 1004 removed to reduce weight in some embodiments. In some embodiments, one or more holes 1004 can be cut out from the support panel 1002 to reduce the weight of the support panel 1002. Research and analysis can be performed to determine which material to remove, how much material to remove, and/or how to remove the material, while still attempting to maximize the structural strength and/or other desired properties of the support panel 1002. In some instances, the removed material can be recycled or reused, thereby saving or generating additional resources.

Figure 11:
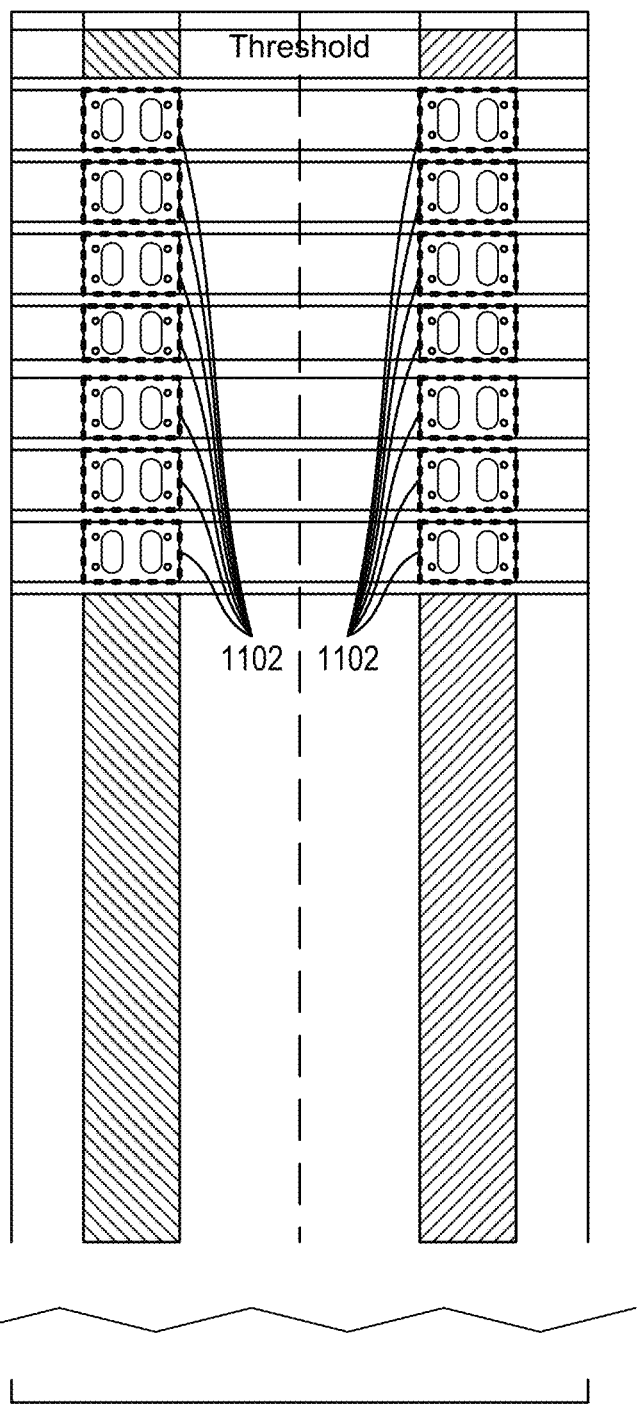
FIG. 11 illustrates a top view of an example foundational base assembly having implemented support panels with material removed to reduce weight in some embodiments.

FIG. 11 illustrates a top view of an example foundational base assembly 1100 having implemented support panels 1102 with material removed to reduce weight in some embodiments. In the example of FIG. 11, a total of 14 support panels 1102 can be installed in an area 0 to 8 feet away in longitudinal length from an entrance of a shipping container. In this example, the shipping container can be a 40 feet long container. In some embodiments, removing material (e.g., creating holes) from the support panels may reduce the total weight of the support panels 1102 and the shipping container. For example, if the support panels 1102 are made out of steel, then the cumulative effect of cutting out two holes in each support panel 1102 may significantly decrease the weight of the support panels 1102.

FIG. 12A illustrates an example flow diagram 1200 for providing protection of floorings in some embodiments. It should be appreciated that there can be additional, fewer, or alternative steps performed in similar or alternative orders, or in parallel, within the scope of the various embodiments unless otherwise stated.

At step 1202, a first ledger can be attached to an upper portion of a first support beam associated with a foundational base assembly. A portion of the first ledger can protrude outward in a first horizontal direction from the upper portion of the first support beam.

At step 1204, a second ledger can be attached to an upper portion of a second support beam next to the first support beam. A portion of the second ledger can protrude outward in a second horizontal direction from the upper portion of the second support beam. The second horizontal direction can be facing the first horizontal direction.

At step 1206, a support panel can be placed on top of the portion of the first ledger and the portion of the second ledger. The support panel can have a length proximate to a distance between the first support beam and the second support beam.

Figure 12B:
FIG. 12B illustrates an example flow diagram for providing protection of floorings in some embodiments.
Figure 12B:

FIG. 12B illustrates an example flow diagram 1250 for providing protection of floorings. Again, it should be understood that there can be additional, fewer, or alternative steps performed in similar or alternative orders, or in parallel, within the scope of the various embodiments unless otherwise stated.

At step 1252, an amount of force can be absorbed by a support panel. The support panel can be placed on top of a portion of a first ledger and on top of a portion of a second ledger. For example, wheels of a forklift carrying a load may put pressure on a portion of floor that is supported by the support panel which is resting on two ledgers. The two ledgers being coupled, respectively, to two support beams.

At step 1254, the amount of force is distributed by the support panel to a first support beam having an upper portion attached to the first ledger and to a second support beam having an upper portion attached to the second ledger.

At step 1256, an amount of stress incurred by at least a portion of wood flooring overlaying the support panel is reduced. The amount of stress may be reduced based on the distributing, by the support panel, of the amount of force to the first support beam and to the second support beam. In some embodiments, the support panel can distribute the amount of force to the first support beam via the first ledger and to the second support beam via the second ledger.

Various embodiments are described herein as examples. It will be apparent to those skilled in the art that various modifications may be made and other embodiments or approaches can be used without departing from the broader scope of the present invention. Therefore, these and other variations upon the exemplary embodiments are intended to be covered by the present invention(s).

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A system comprising:
   a foundational base assembly comprising a plurality of support beams aligned parallel to each other, each support beam of the plurality of support beams including a top portion having a top beam surface, a bottom portion opposite the top portion, a first side wall between the bottom portion and the top portion, and a second side wall between the bottom portion and the top portion;
   each support beam of a subset of the plurality of support beams including a first longitudinal ledger attached to a first upper longitudinal portion of the first side wall of the support beam and a second separate longitudinal ledger attached to a second upper longitudinal portion of the second side wall of the support beam, a first outwardly protruding portion of the first longitudinal ledger protruding outwardly from the first upper longitudinal portion of the first side wall, a second outwardly protruding portion of the second longitudinal ledger protruding outwardly from the second upper longitudinal portion of the second side wall, each of the first longitudinal ledger and the second longitudinal ledger having a longitudinal length; and
   one or more support panels disposed between adjacent support beams of the subset of the plurality of support beams, each support panel of the one or more support panels having a top panel surface, each support panel of the one or more support panels disposed on top of the first outwardly protruding portion of the first longitudinal ledger of a first support beam of the subset of the plurality of support beams and on top of the second outwardly protruding portion of the second longitudinal ledger of a second support beam of the subset of the plurality of support beams, the second support beam being adjacent to the first support beam, the top beam surface of the top portion of each support beam of the subset of the plurality of support beams being approximately coplanar with the top panel surface of each support panel of the one or more support panels, each support panel having a first downwardly projecting flange on a first edge between the first support beam and the second support beam and having a second downwardly projecting flange on a second end opposite the first end between the first support beam and the second support beam, the distance between the first end and the second end being approximately equal to the longitudinal length so that when the support panel is positioned over the first longitudinal ledger and the second longitudinal ledger the first flange and the second flange restrict movement of the support panel.

2. The system of claim 1, wherein the system is a floor.

3. The system of claim 2, wherein the floor is part of a shipping container, and wherein the one or more support panels are placed proximate to an entrance of the shipping container.

4. The system of claim 3, wherein the shipping container is at least 20 feet long.

5. The system of claim 1, wherein the system includes a layer of wood flooring overlaid over the foundational base assembly.

6. The system of claim 5, wherein the layer of wood flooring is fastened onto the one or more support panels.

7. The system of claim 1, wherein each of the one or more support panels is at least one of 1) detachably placed or 2) secured onto the outwardly protruding portions of the first longitudinal ledger and the outwardly protruding portions of the second longitudinal ledger.

8. The system of claim 1, wherein at least one first longitudinal ledger and at least one second longitudinal ledger each include at least one of an angle ledger, a flat ledger, a ledger having a rectangular cross section, a ledger having a triangular cross section, a ledger having a round cross section, or a ledger having a solid cross section.

9. The system of claim 8, wherein the at least one first longitudinal ledger includes the angle ledger and the at least one second longitudinal ledger includes the flat ledger.

10. The system of claim 9, wherein the angle ledger has a first plane and a second plane connected perpendicularly along edges of the first and second planes, wherein the first plane is attached to the first upper longitudinal portion of the first support beam and the second plane protrudes in a first horizontal direction from the first upper longitudinal portion of the first support beam, wherein the flat ledger has a third plane, and wherein a first portion of the third plane is attached to the second upper longitudinal portion of the second support beam and a second portion of the third plane protrudes in a second horizontal direction from the second upper longitudinal portion of the second support beam.

11. The system of claim 1, wherein each of the first support beam and the second support beam includes at least one of a C-beam cross-member, an I-beam cross-member, a cross-member having a rectangular cross section, or a cross-member having a solid cross section.

12. The system of claim 1, wherein at least a portion of material used to construct each of the one or more support panels is removed, thereby reducing a weight of the support panel.

13. A method comprising:
   attaching a first longitudinal ledger to a first upper longitudinal portion of a first support beam of a plurality of support beams of a foundational base assembly, a first outwardly protruding portion of the first longitudinal ledger protruding outwardly from the first upper longitudinal portion of the first support beam, the first support beam including a first top portion having a first top beam surface, a first bottom portion opposite the first top portion, a first side wall between the first bottom portion and the first top portion, and a second side wall between the first bottom portion and the first top portion;

attaching a second longitudinal ledger to a second upper longitudinal portion of a second support beam of the plurality of support beams of the foundational base assembly, a second outwardly protruding portion of the second longitudinal ledger protruding outwardly from the second upper longitudinal portion of the second support beam, the second support beam including a second top portion having a second top beam surface, a second bottom portion opposite the second top portion, a first side wall between the second bottom portion and the second top portion, and a second side wall between the second bottom portion and the second top portion, each of the first longitudinal ledger and the second longitudinal ledger having a longitudinal length; and disposing a support panel on top of the first outwardly protruding portion of the first longitudinal ledger of the first support beam and the second outwardly protruding portion of the second longitudinal ledger of the second support beam, the support panel having a top panel surface, the first support beam being adjacent to the second support beam, the first longitudinal ledger of the first support beam extending outwardly towards the second longitudinal ledger of the second support beam, the top panel surface of the support panel being approximately coplanar with the first top surface of the first top portion of the first support beam and the second top surface of the second top portion of the second support beam, each support panel having a first downwardly projecting flange on a first edge between the first support beam and the second support beam and having a second downwardly projecting flange on a second end opposite the first end between the first support beam and the second support beam, the distance between the first end and the second end being approximately equal to the longitudinal length so that when the support panel is positioned over the first longitudinal ledger and the second longitudinal ledger the first flange and the second flange restrict movement of the support panel.

14. The method of claim 13, wherein the system is a floor.

15. The method of claim 14, wherein the floor is part of a shipping container, and wherein the support panel is placed proximate to an entrance of the shipping container.

16. The method of claim 15, wherein the shipping container is at least 20 feet long.

17. The method of claim 13, further comprising:
overlaying the foundational base assembly with a layer of wood flooring.

18. The method of claim 17, further comprising:
fastening the layer of wood flooring onto the support panel.

19. The method of claim 13, wherein the support panel is at least one of 1) detachably placed or 2) secured onto the first outwardly protruding portion of the first longitudinal ledger and the second outwardly protruding portion of the second longitudinal ledger.

20. The method of claim 13, wherein the first longitudinal ledger and the second longitudinal ledger each include at least one of an angle ledger, a flat ledger, a ledger having a rectangular cross section, a ledger having a triangular cross section, a ledger having a round cross section, or a ledger having a solid cross section.

21. The method of claim 20, wherein the first longitudinal ledger includes the angle ledger and the second longitudinal ledger includes the flat ledger.

22. The method of claim 21, wherein the angle ledger has a first plane and a second plane connected perpendicularly along edges of the first and second planes, wherein the first plane is attached to the first upper longitudinal portion of the first support beam and the second plane protrudes in a first horizontal direction from the first upper longitudinal portion of the first support beam, wherein the flat ledger has a third plane, and wherein a first portion of the third plane is attached to the second upper longitudinal portion of the second support beam and a second portion of the third plane protrudes in a second horizontal direction from the second upper longitudinal portion of the second support beam.

23. The method of claim 13, wherein each of the first support beam and the second support beam includes at least one of a C-beam cross-member, an I-beam cross-member, a cross-member having a rectangular cross section, or a cross-member having a solid cross section.

24. The method of claim 13, further comprising:
removing at least a portion of material used to construct the support panel, thereby reducing a weight of the support panel.

* * * * *